(12) United States Patent
de Graaff et al.

(10) Patent No.: US 11,083,323 B2
(45) Date of Patent: Aug. 10, 2021

(54) CONTAINER FOR CONTAINING A BEVERAGE BASE MATERIAL, A BEVERAGE PREPARATION SYSTEM INCLUDING AN AUTOMATIC BEVERAGE PREPARATION APPARATUS AND SUCH A CONTAINER, AN AUTOMATIC BEVERAGE PREPARATION APPARATUS FOR USE IN SUCH A BEVERAGE PREPARATION SYSTEM AND A METHOD OF PREPARING A BEVERAGE USING SUCH A BEVERAGE PREPARATION SYSTEM

(71) Applicant: Koninklijke Douwe Egberts B.V., Utrecht (NL)

(72) Inventors: Gerbrand Kristiaan de Graaff, Utrecht (NL); Christiaan Johannes Maria Moorman, Utrecht (NL); Roy Gilsing, Utrecht (NL); Richard Stephens, Utrecht (NL); Jo Fleming, Utrecht (NL); Brad Phillips, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 551 days.

(21) Appl. No.: 15/855,344

(22) Filed: Dec. 27, 2017

(65) Prior Publication Data
US 2018/0325301 A1      Nov. 15, 2018

Related U.S. Application Data

(63) Continuation of application No. PCT/NL2016/050467, filed on Jun. 30, 2016.

(51) Int. Cl.
*A47J 31/06*        (2006.01)
*B65D 85/804*    (2006.01)
(Continued)

(52) U.S. Cl.
CPC ....... *A47J 31/0663* (2013.01); *A47J 31/0668* (2013.01); *A47J 31/0684* (2013.01);
(Continued)

(58) Field of Classification Search
None
See application file for complete search history.

(56) References Cited

U.S. PATENT DOCUMENTS 9,370,274 B2 *   6/2016   Bodum ............... A47J 31/0631
2006/0186134 A1   8/2006   Medema
(Continued)

FOREIGN PATENT DOCUMENTS

| EP | 2 016 877 A1 | 1/2009 |
|----|--------------|--------|
| FR | 2885289 A1 | 11/2006 |
| WO | WO-2010/137952 A1 | 12/2010 |

OTHER PUBLICATIONS

International Search Report and Written Opinion, PCT/NL2016/050467, Koninklijke Douwe Egberts B.V., 9 pages (dated Oct. 19, 2016).

*Primary Examiner* — Ibrahime A Abraham
*Assistant Examiner* — Elizabeth M Sims
(74) *Attorney, Agent, or Firm* — Fitch, Even, Tabin & Flannery, LLP

(57) ABSTRACT

A container contains a beverage base material in a beverage base material chamber defined by a chamber bottom and a chamber wall. The container furthermore comprises an elongated handle extending in a direction having a radial component outward from the chamber. The handle is provided with an outlet channel extending from the chamber to a channel outlet provided at the free end of the handle. A beverage preparation system for preparing a beverage includes an automatic beverage preparation apparatus and such a container and is arranged for removably connecting the container to the apparatus such that the handle is
(Continued)

positioned vertically with the channel outlet pointing downwards. A method of preparing a beverage using such a beverage preparation system in which the container is connected to the apparatus such that the handle is positioned vertically with the channel outlet pointing downwards for dispensing a beverage from the beverage base material chamber substantially vertically.

23 Claims, 15 Drawing Sheets

(51) Int. Cl.
  *A47J 31/46* (2006.01)
  *A47J 31/36* (2006.01)
  *A47J 31/44* (2006.01)

(52) U.S. Cl.
  CPC ......... *A47J 31/369* (2013.01); *A47J 31/4492* (2013.01); *A47J 31/4496* (2013.01); *A47J 31/46* (2013.01); *B65D 85/8043* (2013.01)

(56) References Cited

U.S. PATENT DOCUMENTS

2013/0299608 A1\* 11/2013 Spangler ................... B05B 1/08
                                                           239/444
2014/0123860 A1   5/2014 Bodum \* cited by examiner Fig. 1C
Fig. 1D
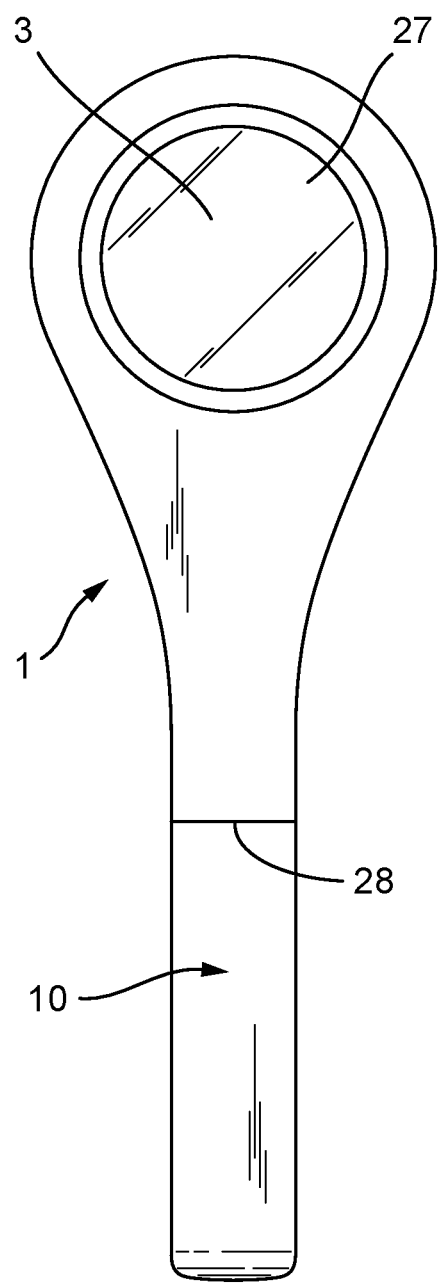
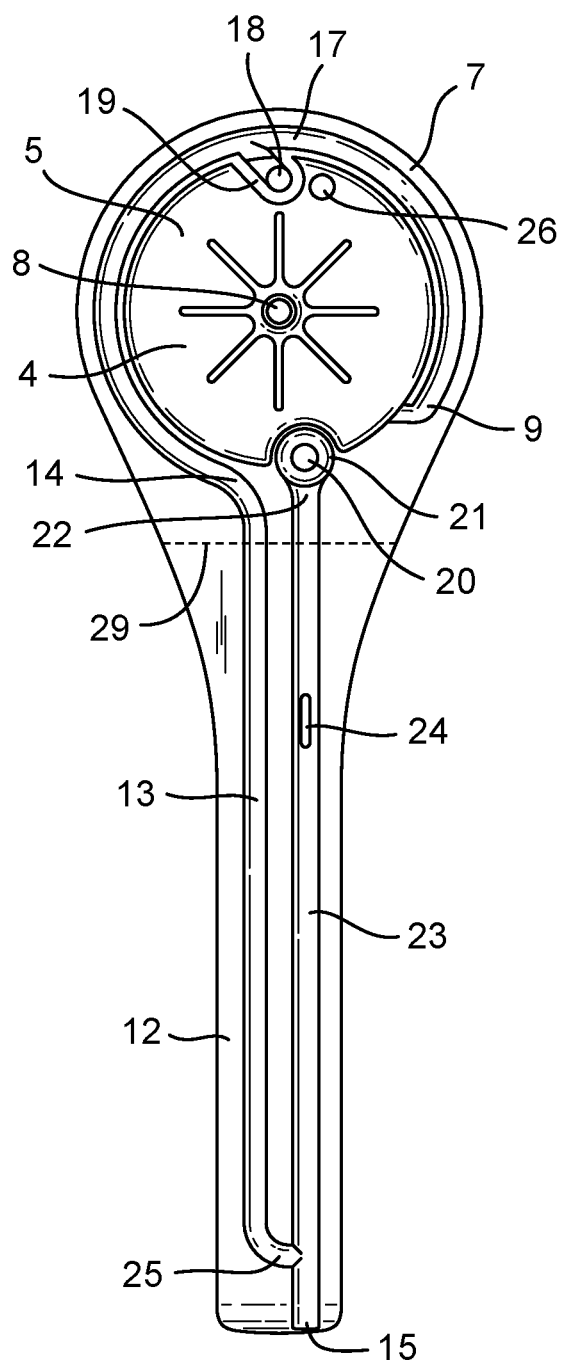

Fig. 1E
Fig. 1F
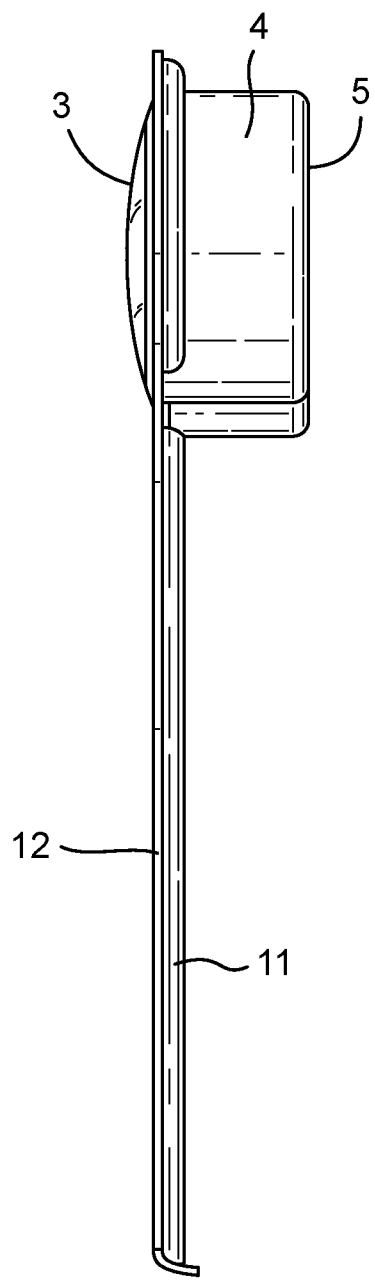
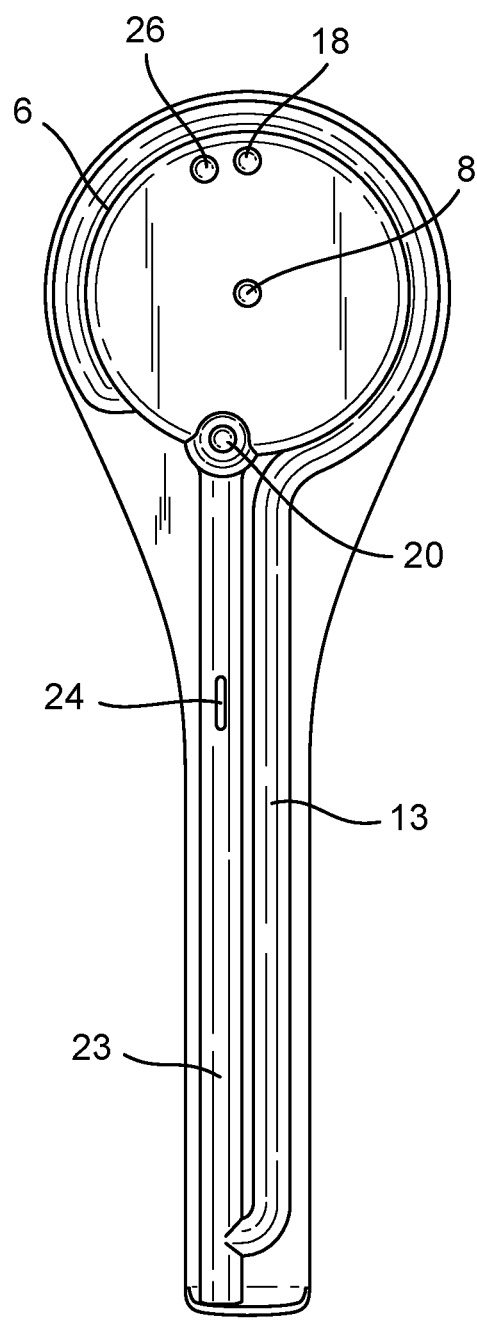

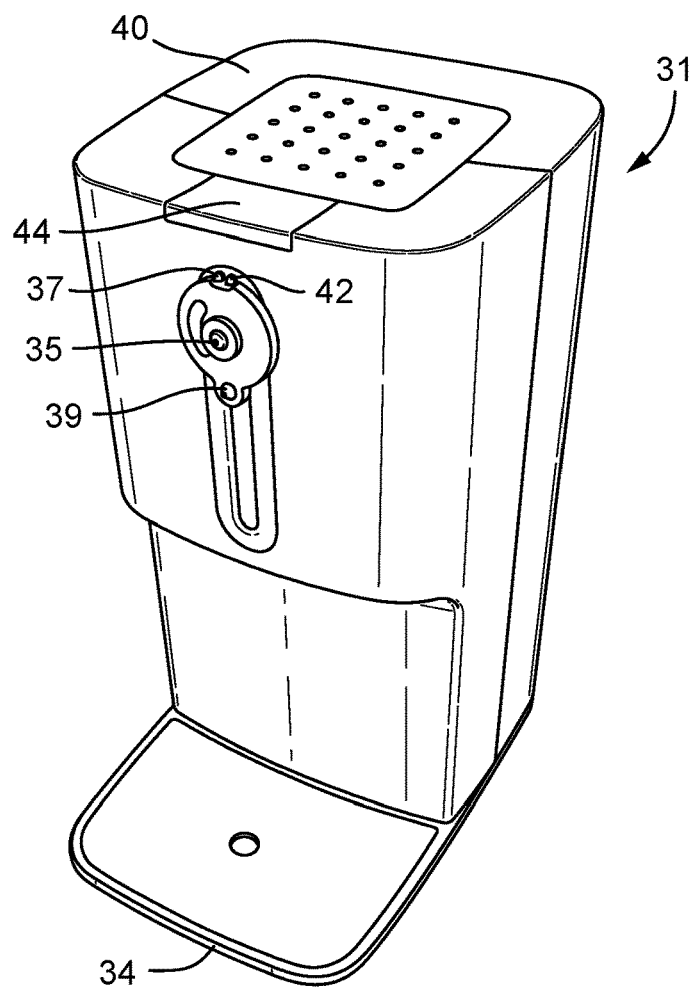
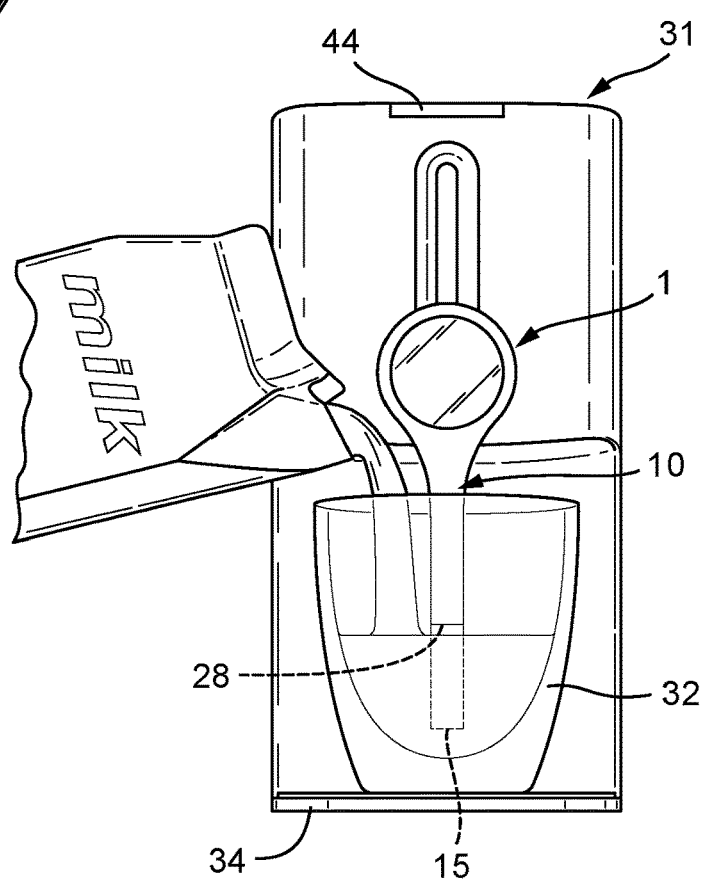

Fig. 4A
Fig. 4B
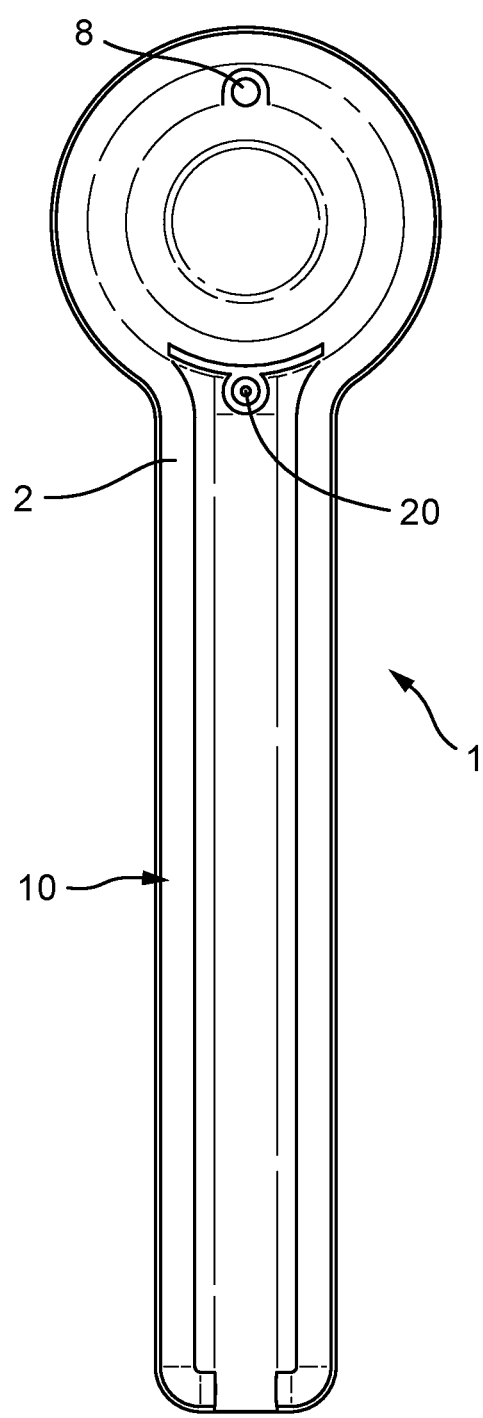
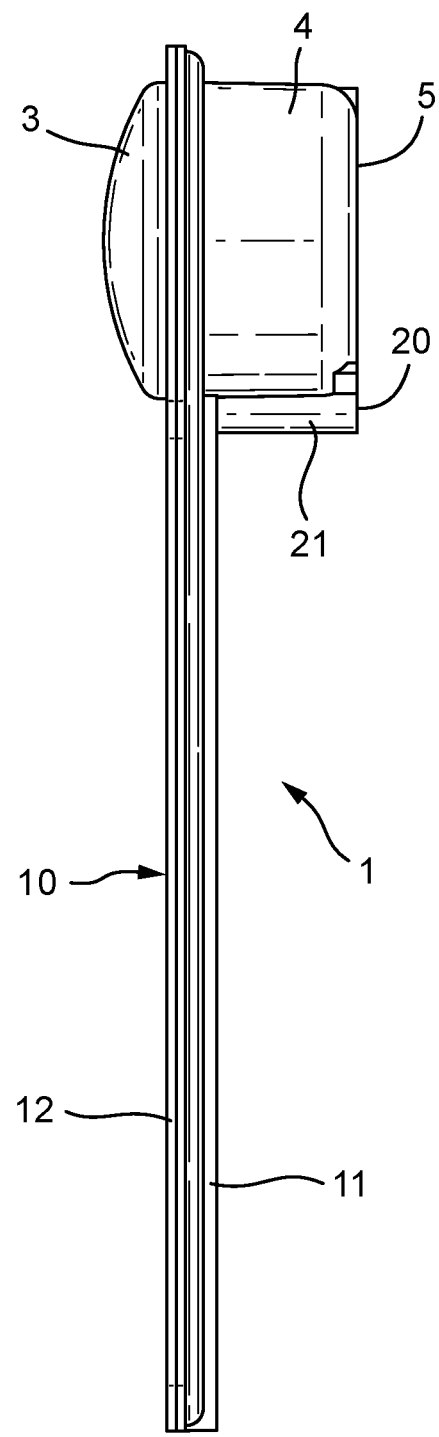

Fig. 4C
Fig. 4D
Fig. 4D1
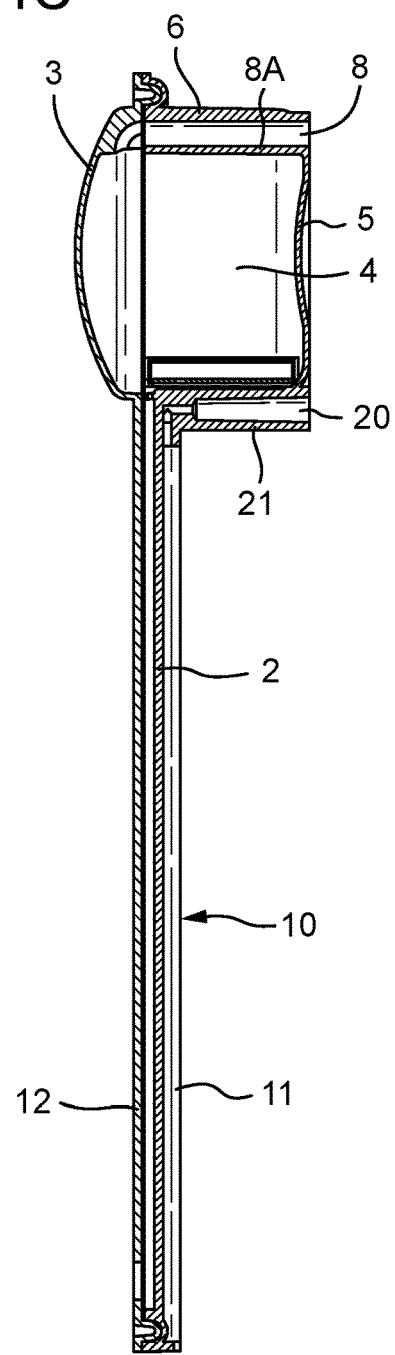
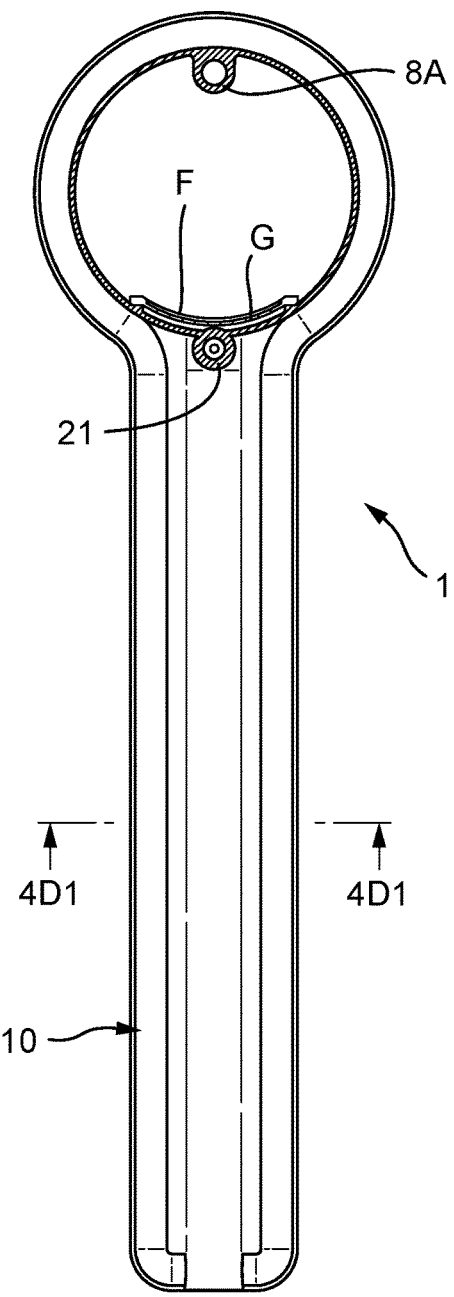
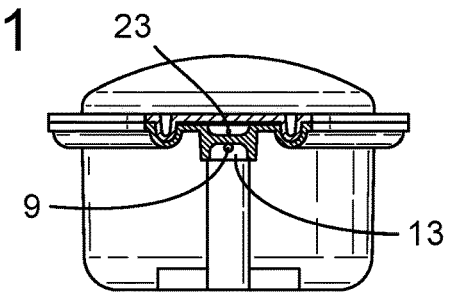

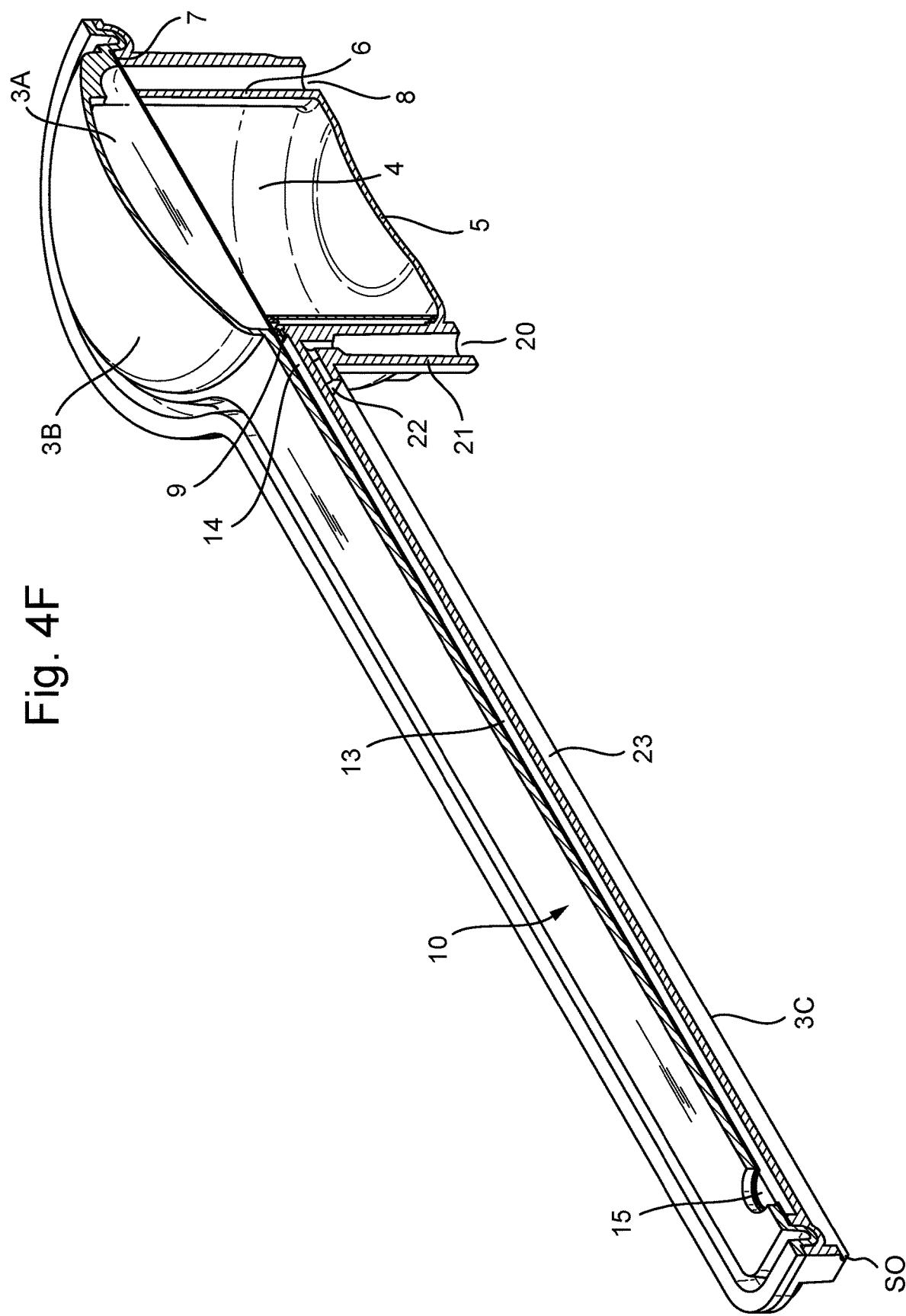

Fig. 5A
Fig. 5B
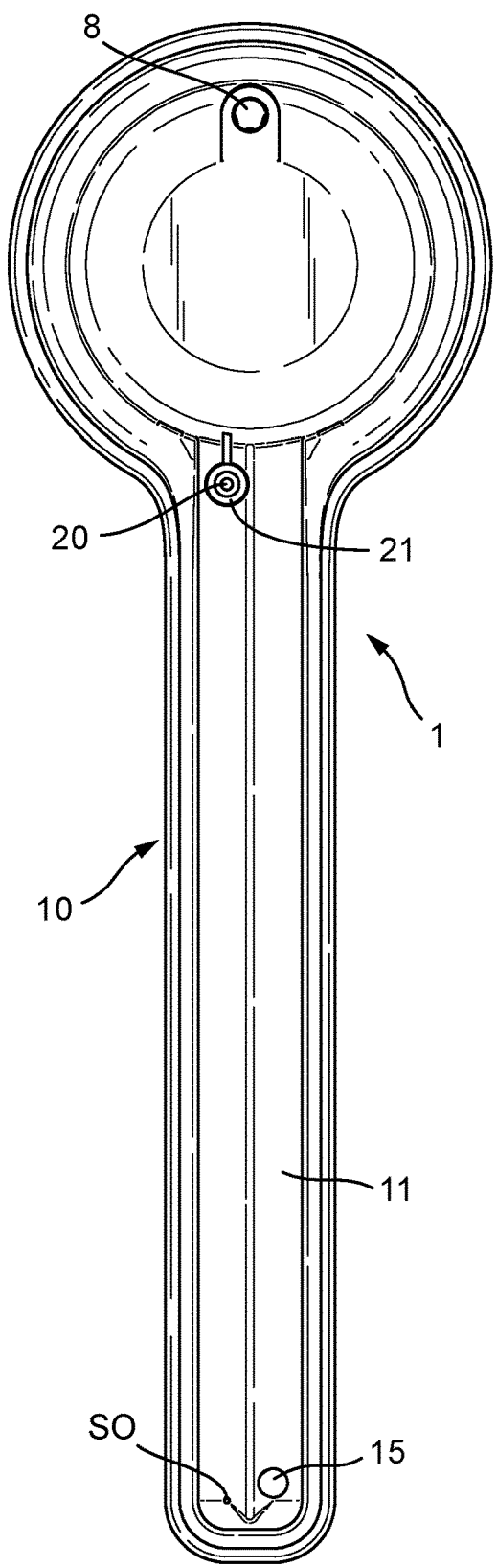
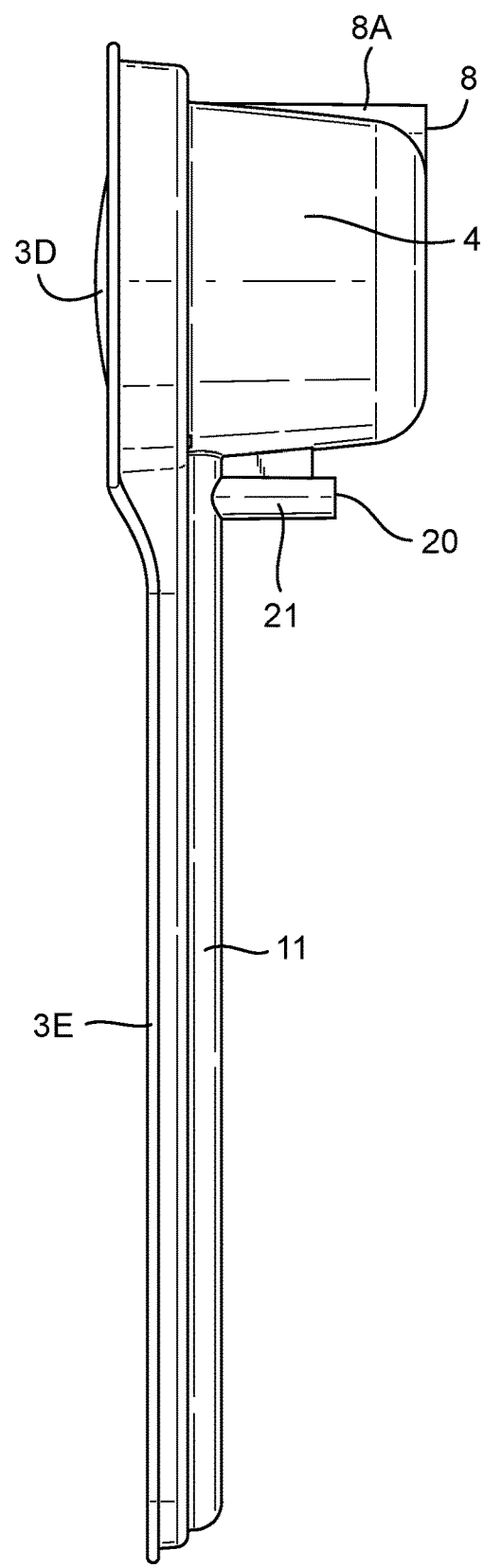

Fig. 5C
Fig. 5D
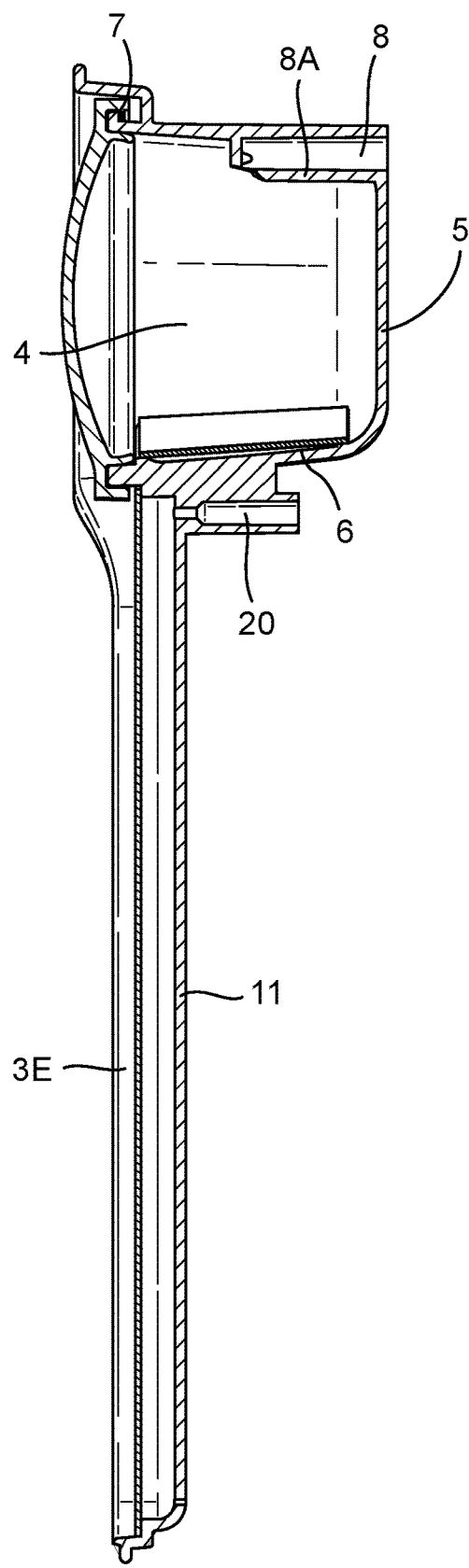
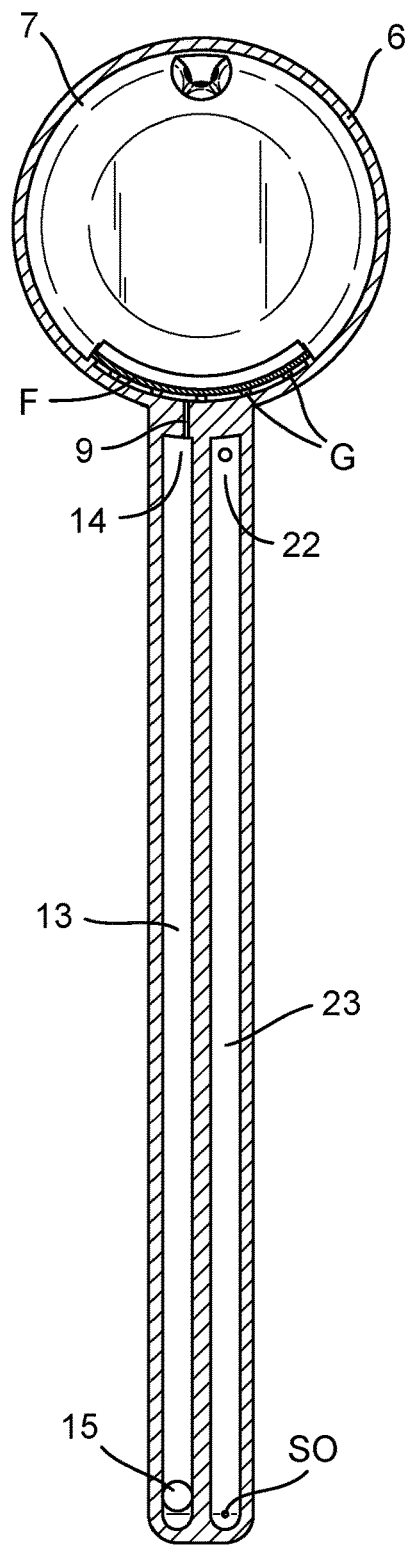

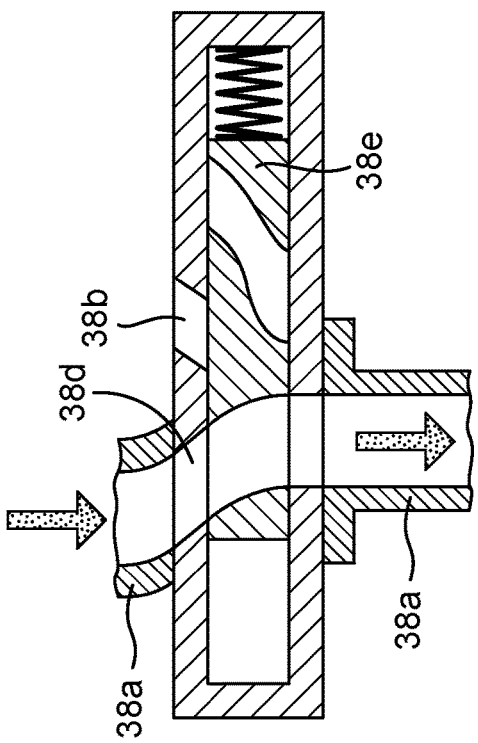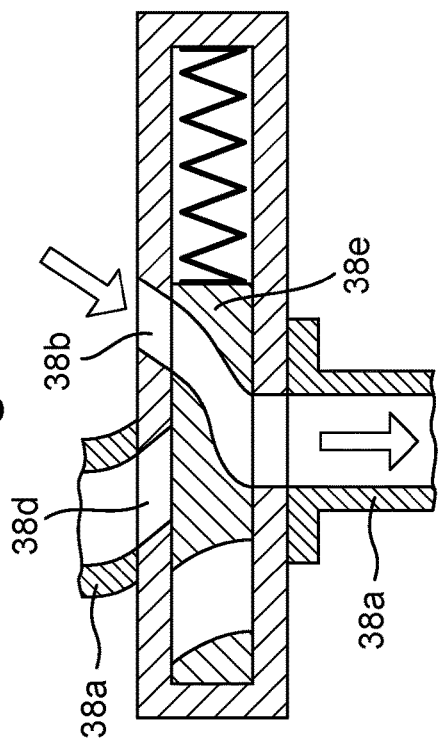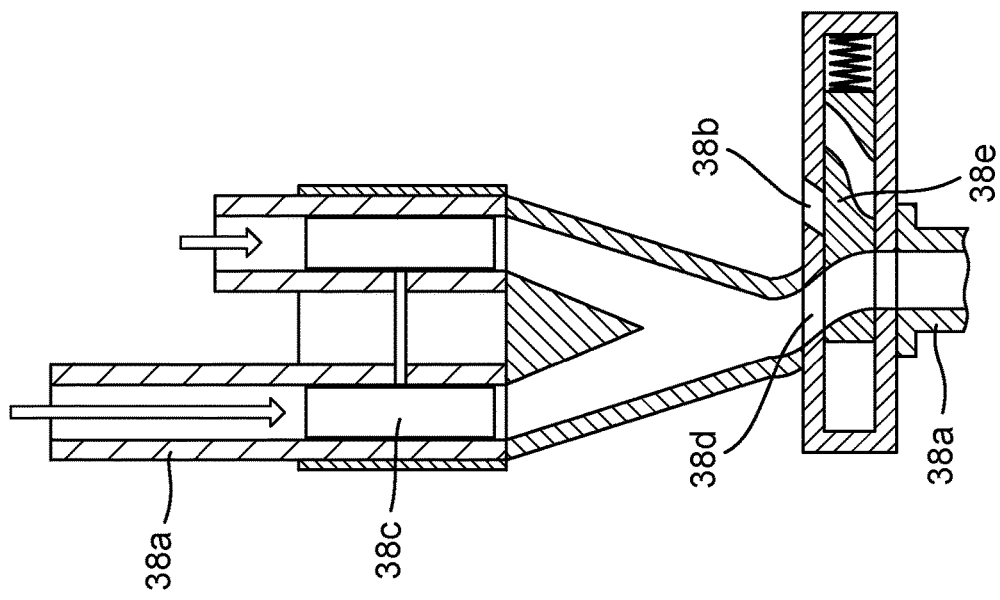

CONTAINER FOR CONTAINING A BEVERAGE BASE MATERIAL, A BEVERAGE PREPARATION SYSTEM INCLUDING AN AUTOMATIC BEVERAGE PREPARATION APPARATUS AND SUCH A CONTAINER, AN AUTOMATIC BEVERAGE PREPARATION APPARATUS FOR USE IN SUCH A BEVERAGE PREPARATION SYSTEM AND A METHOD OF PREPARING A BEVERAGE USING SUCH A BEVERAGE PREPARATION SYSTEM

CROSS-REFERENCE TO RELATED APPLICATIONS

This application is a continuation of PCT/NL2016/050467, filed Jun. 30, 2016, which claims the benefit of and priority to Netherlands Application No. NL 2015067, filed Jul. 1, 2015, the entire contents of each of which are incorporated herein by reference.

BACKGROUND

The invention relates to a container for containing a beverage base material, said container including a base body and a cover, said base body comprising a beverage base material chamber defined by a chamber bottom and a chamber wall at the perimeter of the chamber bottom, the chamber of the base body being open at the side opposite the chamber bottom, said chamber wall being provided with a sealing surface at its free end opposite the chamber bottom, the cover being attached to the sealing surface of the chamber wall for closing the beverage base material chamber, said container comprising an intake opening for taking in an extraction medium to the beverage base material chamber and a dispensing opening for dispensing a beverage from the beverage base material chamber. Such a container is e.g. known from WO-A1-2010/137952. This known container is a capsule comprising a circumferential wall, a bottom and a lid. The wall, bottom and lid enclose an inner space comprising an extractable product. The capsule comprises an exit area to allow draining of the prepared beverage from the capsule there through, wherein the exit area comprises a filter layer. The bottom comprises an entrance area through which fluid can be supplied by a fluid dispensing device after the capsule has been properly installed in a chamber of an automatic beverage preparing device. The exit area of the capsule is provided in the lid which is pierceable by lid piercing means of the automatic beverage preparing device so that prepared beverage can be dispensed via the exit area of the capsule and dispensing means of the automatic beverage preparing device. Although this known capsule can be used in a satisfactory way for making a beverage in an automatic beverage preparing device there is a constant need for new kinds of containers which are more user friendly and which can be used to prepare more kinds of beverages in an easy manner.

SUMMARY

It is therefore an object of the invention to provide a container for containing a beverage base material coffee beverage preparation system which is suitable for preparing multiple kinds of beverages without the need for using a separate automatic beverage preparation apparatus for each kind of beverage. It is furthermore an object of the invention to provide a container for containing a beverage base material with which it is not necessary any more to clean the automatic beverage preparation apparatus after the beverage has been prepared, thereby improving the taste of each beverage which is prepared. It is furthermore an object of the invention to provide a container for containing a beverage base material which, when used to prepare a beverage, provides the user the ability to experience at least a substantial part of preparing the beverage thereby providing a more appealing manner of preparing a beverage.

The above object is achieved in accordance with the invention by providing a container for containing a beverage base material, said container including a base body and a cover, said base body comprising a beverage base material chamber defined by a chamber bottom and a chamber wall at the perimeter of the chamber bottom, the chamber of the base body being open at the side opposite the chamber bottom, said chamber wall being provided with a sealing surface at its free end opposite the chamber bottom, the cover being attached to the sealing surface of the chamber wall for closing the beverage base material chamber, said container comprising an intake opening for taking in an extraction medium to the beverage base material chamber and a dispensing opening for dispensing a beverage from the beverage base material chamber, characterized in that the container furthermore comprises an elongated handle extending in a direction having a radial component outward from the beverage base material chamber, said elongated handle being integral with the base body and comprising a handle bottom and a handle sealing flange which is flush with the sealing surface of the chamber wall, said dispensing opening for dispensing a beverage from the beverage base material chamber being provided in the sealing surface of the chamber wall, said handle being provided with an outlet channel extending from an upstream channel inlet communicating with the dispensing opening to a downstream channel outlet provided at the free end of the handle, said cover being furthermore attached to the sealing flange of the handle for closing the outlet channel in a direction opposite the handle bottom. By using a container having a handle with an outlet channel for dispensing a prepared beverage the beverage prepared by using such a container when it is installed in a beverage preparing apparatus need not come into contact with parts of the beverage preparing apparatus. In this manner regular cleaning of the beverage preparing apparatus can be dispensed with and in addition remainders of a beverage prepared earlier do not influence the taste of a (different kind of) beverage prepared thereafter. In this manner it is possible to use containers containing a variety of different beverage base materials in only a single beverage preparation apparatus.

In an embodiment of a container according to the invention the height of the chamber wall is at least four times, preferably five times, more preferred six times larger than the height of the elongated handle. In this manner the handle can be handled by a user for preparing a beverage quite easily.

In a further embodiment of a container according to the invention the sealing flange of the handle surrounds the channel outlet, the cover is attached to the sealing flange for closing the channel outlet and the cover is weakened at the location of the channel outlet for being opened by beverage dispensed through the outlet channel. In this manner the inside of the container can be sealed off completely from the surroundings before it is used in a beverage preparation apparatus thereby improving hygiene. In addition by locally weakening the cover so that it can be opened by pressure of the beverage under preparation no additional means on the beverage preparation apparatus are necessary for opening the beverage exit of the container.

Preferably the intake opening for taking in an extraction medium to the beverage base material chamber is formed by a pierceable extraction medium intake portion provided in the chamber bottom.

In an embodiment of a container according to the invention the container further comprises an extraction medium inlet pipe extending from the pierceable extraction medium intake portion into the beverage base material chamber.

In a still further embodiment of a container according to the invention said dispensing opening for dispensing a beverage from the beverage base material chamber is provided in the sealing surface of the chamber wall. A compact container can then be provided in an embodiment in which the upstream channel inlet communicates with the dispensing opening via a peripheral dispensing channel provided in the sealing surface of the chamber wall.

In an alternative embodiment of said dispensing opening for dispensing a beverage from the beverage base material chamber is provided by a dispensing hole in the chamber wall.

In a further embodiment of a container according to the invention the chamber bottom is provided with a pierceable extraction medium bypass intake portion, in that the chamber wall is provided with an extraction medium bypass pipe extending from the pierceable extraction medium bypass intake portion to the upstream channel inlet of the outlet channel of the handle. By using an extracting medium bypass a more consistent output of beverage from the container can be obtained and furthermore the strength of the prepared beverage can be adjusted via said extracting medium bypass. It is then in particular advantageous when the extraction medium bypass pipe discharges into the peripheral dispensing channel provided in the sealing surface of the chamber wall.

In a still further embodiment of a container according to the invention the container (preferably the chamber bottom) is provided with a pierceable steam inlet portion, the handle is provided with a steam channel extending from an upstream steam channel inlet to a downstream steam channel outlet provided at the free end of the handle, the container is provided with a steam inlet pipe extending from the pierceable steam inlet portion to the upstream steam channel inlet of the steam outlet channel of the handle, and said cover is furthermore attached to the sealing flange of the handle for closing the steam channel in a direction opposite the handle bottom. In this manner the container itself can be used to supply steam, e.g. into fresh milk poured into a cup to prepare milk foam. To provide a more consistent flow of steam through the steam channel the steam channel is provided with an air inlet opening, preferably an air inlet slot provided in the handle bottom.

In an advantageous embodiment of a container according to the invention the outlet channel discharges into the steam channel at a distance from the free end of the handle and in that the channel outlet is formed by the steam channel outlet. In this manner prepared beverage is introduced into the steam channel so that it is possible to provide the prepared beverage with a structure that can enhance taste and visual appearance.

In a particular embodiment of a container according to the invention the chamber bottom is provided with a pierceable aroma vent portion. In this manner it is possible to let aroma escape from the container during extraction of the beverage within the beverage base material chamber which can provide the user of the container with a more pleasant experience while preparing the beverage.

In a further embodiment of a container according to the invention the cover is at least partially transparent, preferably opposite the chamber bottom. In this manner it is possible for a user to check the contents of the chamber but also to actually witness the extraction process which provides an additional sense enhancing experience while preparing the beverage.

It can be advantageous when the handle is provided with a marking for indicating a minimum level of an additional ingredient to be combined with the beverage. In this manner it is possible to provide the user with an indication of a suggested minimum level of additional ingredient, e.g. fresh milk, to be provided in a cup of standardized cross-section in order to prepare a beverage, e.g. coffee, according to a standardized recipe.

To improve hygiene the outer surface of the chamber bottom of a container according to an embodiment of the invention is provided with a manually removable sealing membrane. Alternatively or in addition the container can be provided with a manually removable paper sleeve at least surrounding the handle.

In an embodiment of a container according to the invention the base body is provided with a tear line between the beverage base material chamber and the handle for manually removing the handle. In this manner the handle can be removed in container variants that do not require steam to be introduced in an additional ingredient and to allow the use of the container in other beverage preparing apparatuses.

In case the container is provided with an identifier provided with data, said data being readable by a reader in an apparatus for preparing a beverage, the beverage preparing apparatus being controlled in dependence on the data it is possible to control the apparatus such as to prepare the beverage in an optimal, default manner, e.g. by adjusting the temperature and amount of hot water to be supplied into the beverage base material chamber and/or the temperature and duration of supplying steam into an amount of milk poured into a cup in dependence of the read data. Preferably the identifier comprises protrusions and/or depressions in the chamber bottom.

In a particularly advantageous embodiment of a container according to the invention the base body is molded from bio plastics, such as PLA (TBC), so that a used container is biodegradable and does not form an environmental impact.

In a still further embodiment of a container according to the invention the container comprises a circulation channel provided on the elongated handle near the channel outlet end of the elongated handle, said circulation channel having an intake opening and a separate outlet opening which latter is positioned adjacent the channel outlet, said circulation channel being preferably substantially parallel to the outlet channel of the elongated handle. In this manner a circulation of steam and milk in the circulation channel can be realized for more efficiently heating and frothing the beverage. The circulation channel can be formed by an addition tube arranged on the tubular wall near the channel outlet end of the elongated handle or by a coaxial circulating sleeve forming the circulation channel between the inner wall of the circulating sleeve and the outer wall of the elongated handle.

Although a container according to the invention is suitable for containing a large variety of beverage base materials the invention is in particular advantageous when the container contains an amount of roasted ground coffee for a single serving.

The invention also relates to a beverage preparation system for preparing a beverage, said beverage preparation system including an automatic beverage preparation apparatus and a container for containing a beverage base material according to the invention, said automatic beverage preparation apparatus comprising an extracting medium supplying device for supplying an extracting medium for preparing a beverage on the basis of interaction of extracting medium with the beverage base material, said extracting medium supplying device comprising a horizontal support surface and an extracting medium supplying nozzle, said beverage preparation system comprising a container holder arranged for removably connecting the container to a container holder of the automatic beverage preparation apparatus such that the elongated handle is positioned at least substantially vertically with the channel outlet pointing downwards for dispensing a beverage from the beverage base material chamber substantially vertically. By using a container having a handle with an outlet channel for vertically dispensing a prepared beverage the beverage prepared by such a container when it is installed in a beverage preparing apparatus need not come into contact with parts of the beverage preparing apparatus and can be dispensed via the handle into a cup positioned below the handle. In this manner regular cleaning of the beverage preparing apparatus can be dispensed with and in addition remainders of a beverage prepared earlier do not influence the taste of a (different kind of) beverage prepared thereafter. In this manner it is possible to use containers containing a variety of different beverage base materials in only a single beverage preparation apparatus. In addition the automatic beverage preparation apparatus can then be free of a brewing device and be of a much more simple and compact construction.

In an embodiment of a beverage preparation system for preparing a beverage according to the invention the beverage preparation system is arranged for piercing the pierceable extraction medium intake portion by the extracting medium supplying nozzle upon connecting the container to the automatic beverage preparation apparatus and/or the automatic beverage preparation apparatus comprises an extracting medium bypass supplying device having an extracting medium bypass supplying nozzle and in that said beverage preparation system is arranged for piercing the pierceable extraction medium bypass intake portion by the extracting medium bypass supplying nozzle upon connecting the container to the automatic beverage preparation apparatus and/or the automatic beverage preparation apparatus comprises a steam supplying device having a steam supplying nozzle and in that said beverage preparation system is arranged for piercing the pierceable steam inlet portion by the steam supplying nozzle upon connecting the container to the automatic beverage preparation apparatus and/or the automatic beverage preparation apparatus comprises an aroma vent piercer and in that said beverage preparation system is arranged for piercing the pierceable aroma vent portion by the aroma vent piercer upon connecting the container to the automatic beverage preparation apparatus. In this manner the beverage preparation system and the beverage preparation apparatus can be constructed in a relatively simple manner while providing a reliable operation over an extended period of time.

In an embodiment of a beverage preparation system for preparing a beverage according to the invention safe use of the system can be provided when said automatic beverage preparation apparatus comprises a control device for controlling the operation of at least one supplying device and when the beverage preparation system is arranged for enabling operation by means of the control device only after connecting the container to the automatic beverage preparation apparatus, preferably when said nozzle/nozzles is/are displaceably mounted in the automatic beverage preparation apparatus between an upper connecting position and a lower activating position and when the beverage preparation system is arranged for enabling operation by means of the control device only when said nozzle/nozzles are in the activating position. Safety of use can furthermore be improved in an embodiment in which the beverage preparation system is arranged for allowing connection of the container to the automatic beverage preparation apparatus and disconnection of the container from the automatic beverage preparation apparatus, respectively, only in the upper connecting position.

It can be advantageous when the automatic beverage preparation apparatus comprises a reader for reading data from the identifier of the container and in that the operation of the automatic beverage preparation apparatus is controlled in dependence on said read data. In this manner the operation of the system can be performed largely automatic in which the operation of the apparatus for preparing the beverage is controlled in dependence on the read data.

In a particularly advantageous embodiment of a beverage preparation system according to the invention the automatic beverage preparation apparatus comprises a platform for receiving a beverage cup and an additional ingredient amount detector for detecting an amount of additional ingredient present in said cup and for supplying a signal to the control device indicative for said detected amount, said control device controlling the operation of the steam supplying device in dependence on said signal, so that the temperature and amount of steam introduced into the additional ingredient can be optimally adjusted to the amount of additional ingredient.

The invention further relates to an automatic beverage preparation apparatus for use in a beverage preparation system for preparing a beverage according to the invention, said automatic beverage preparation apparatus comprising an extracting medium supplying device for supplying an extracting medium for preparing a beverage on the basis of interaction of extracting medium with a beverage base material, said extracting medium supplying device comprising a horizontal support surface and an extracting medium supplying nozzle, said automatic beverage preparation apparatus comprising a container holder being arranged for removable connection of a container according to the invention such that the elongated handle is positioned at least substantially vertically with the channel outlet pointing downwards for dispensing a beverage from the beverage base material chamber substantially vertically.

For redundancy reasons, the respective features of the automatic beverage preparation apparatus are not mentioned in the following in detail. However, reference is made to the before-mentioned, wherein all features mentioned as to be relevant or advantageous with regard to the beverage preparation system are transferable to the beverage preparation apparatus.

The invention further relates to a method of preparing a beverage using a beverage preparation system for preparing a beverage according to the invention, the method comprising the steps of connecting the container to the automatic beverage preparation apparatus such that the elongated handle is positioned at least substantially vertically with the channel outlet pointing downwards for dispensing a beverage from the beverage base material chamber substantially vertically.

In an embodiment of a method for preparing a beverage according to the invention the method comprises the step of piercing the pierceable extraction medium intake portion by the extracting medium supplying nozzle upon connecting the container to the automatic beverage preparation apparatus and the step of supplying extracting medium through the outlet channel of the container.

In a further embodiment of a method for preparing a beverage according to the invention the method comprises the step of piercing the pierceable extraction medium bypass intake portion by the extracting medium bypass supplying nozzle upon connecting the container to the automatic beverage preparation apparatus and the step of supplying bypass extracting medium through the outlet channel of the container.

In an advantageous embodiment of a method for preparing a beverage according to the invention the method comprises the step of piercing the pierceable steam inlet portion by the steam supplying nozzle upon connecting the container to the automatic beverage preparation apparatus and the step of supplying steam through the steam channel of the container.

Preferably, the method comprises the step of piercing the pierceable aroma vent portion by the aroma vent piercer upon connecting the container to the automatic beverage preparation apparatus.

In a still further embodiment of a method for preparing a beverage according to the invention the beverage can be prepared in a save manner when preparing the beverage is enabled only after the container has been connected to the container holder of the automatic beverage preparation apparatus.

In a further embodiment of a method for preparing a beverage according to the invention the method of preparing a beverage comprises the step of supplying extracting medium through the outlet channel of the container and at least one of supplying bypass extracting medium through the outlet channel of the container and supplying steam through the steam channel of the container. A beverage can be prepared in a save manner when preparing the beverage is enabled only when said nozzle/nozzles have been positioned in the activating position.

A method for preparing a beverage according to the invention in which the method comprises the step of reading data from the identifier of the container and the step of controlling preparing the beverage in dependence on said read data, preparing the beverage can be performed at least largely automatically.

Preferably the method comprises the step of placing a beverage cup containing an additional ingredient on the platform of the automatic beverage preparation apparatus, the step of detecting an amount of additional ingredient present in said cup and the step of supplying steam into the additional ingredient in the beverage cup in dependence on the detected amount of additional ingredient.

In an advantageous embodiment of a method of preparing a beverage according to the invention the method comprises the step of releasing the container from the container holder after the beverage has been prepared, wherein in particular the step of releasing the container from the container holder is performed automatically by the automatic beverage preparation apparatus. It is then possible to use the container handle as stirrer after the container has been released.

Preparing a beverage can be done easily in an embodiment in which the method comprises the step of placing a cup below the container holder before a container is positioned in the container holder.

In an embodiment of a method for preparing a beverage according to the invention in which the method comprises the step of using a container having a handle with a fill indication mark, wherein preferably the method comprises the step filling the cup with an additional beverage up to the fill indication mark steam can be injected in to the additional beverage during preparing the beverage.

The method for preparing a beverage according to the invention is in particular suitable when the beverage base material in the container is roasted ground coffee and the additional beverage is milk.

In a further embodiment of a method for preparing a beverage according to the invention during the step supplying steam air is introduced into the steam to provide a more consistent flow of steam through the steam channel To further clarify various aspects of embodiments of the present disclosure and additional features and advantages of the embodiments, a more particular description of various aspects and features will be rendered by reference to specific embodiments thereof which are illustrated in the appended drawings. It is appreciated that these drawings depict only typical embodiments of the disclosure and are therefore not to be considered limiting its scope, nor are the figures necessarily drawn to scale.

BRIEF DESCRIPTION OF THE DRAWINGS

The embodiments herein will be described and explained with additional specificity and detail through the use of the accompanying drawings in which:

FIG. 1C shows the first embodiment of a container according to the invention in a view showing the top of the container covered by a partially transparent cover;

FIG. 1D shows the first embodiment of a container according to FIG. 1C with the cover removed;

FIG. 1E shows the first embodiment of a container according to FIG. 1C from the side;

FIG. 1F shows the first embodiment of a container according to FIG. 1C from below;

FIG. 2 schematically shows an automatic beverage preparation apparatus according to the invention in perspective;

FIG. 3A schematically shows a beverage preparation system according to the invention in which the container is connected to a container holder of the apparatus in the operative position while milk, as additional ingredient, is poured into a cup in perspective;

FIG. 4A shows a third embodiment of a container according to the invention in a view showing the bottom of the container;

FIG. 4B shows the third embodiment of a container according to FIG. 4A from the side;

FIG. 4C shows the third embodiment of a container according to FIG. 4B in cross-section;

FIG. 4D shows the third embodiment of a container according to the invention in a view showing the top of the container with the cover removed; FIG. 4D1 shows the third embodiment of a container according to the invention in a view showing a cross-section of the elongated handle;

FIG. 4F shows the third embodiment of a container according to the invention in a perspective view and broken away;

FIG. 5A shows a fourth embodiment of a container according to the invention in a view showing the bottom of the container;

FIG. 5B shows the fourth embodiment of a container according to FIG. 5A from the side;

FIG. 5C shows the fourth embodiment of a container according to FIG. 5B in cross-section;

FIG. 5D shows the fourth embodiment of a container according to the invention in a view showing the top of the container with the cover removed;

FIGS. 6A-6C schematically show a part of a beverage preparation apparatus according to the invention comprising a valve displaceable in a respective connection position for either connecting the steam conduit to a passive air inlet (FIG. 6C) or an active air inlet (FIG. 6B), and FIGS. 7A and 7B schematically show the elongated handle of an embodiment of a container according to the invention positioned in a cup, wherein the container is provided with a circulation channel.

DETAILED DESCRIPTION

By way of example the invention will be described with roasted ground coffee (RGC) as beverage base material. However, the invention is not restricted to roasted ground coffee and the container according to the invention can contain other beverage base materials or food substances including but not limited to tea, herbs, soup, liquid beverage or food concentrate, powdered beverage or food concentrate, syrups, mixes (powdered or liquid concentrate), juices, chocolate drinks. In addition, water will be described as being the extracting medium, but it will be clear that in dependence on the base material another extracting medium, such as e.g. milk, can be used.

Figure 1A:
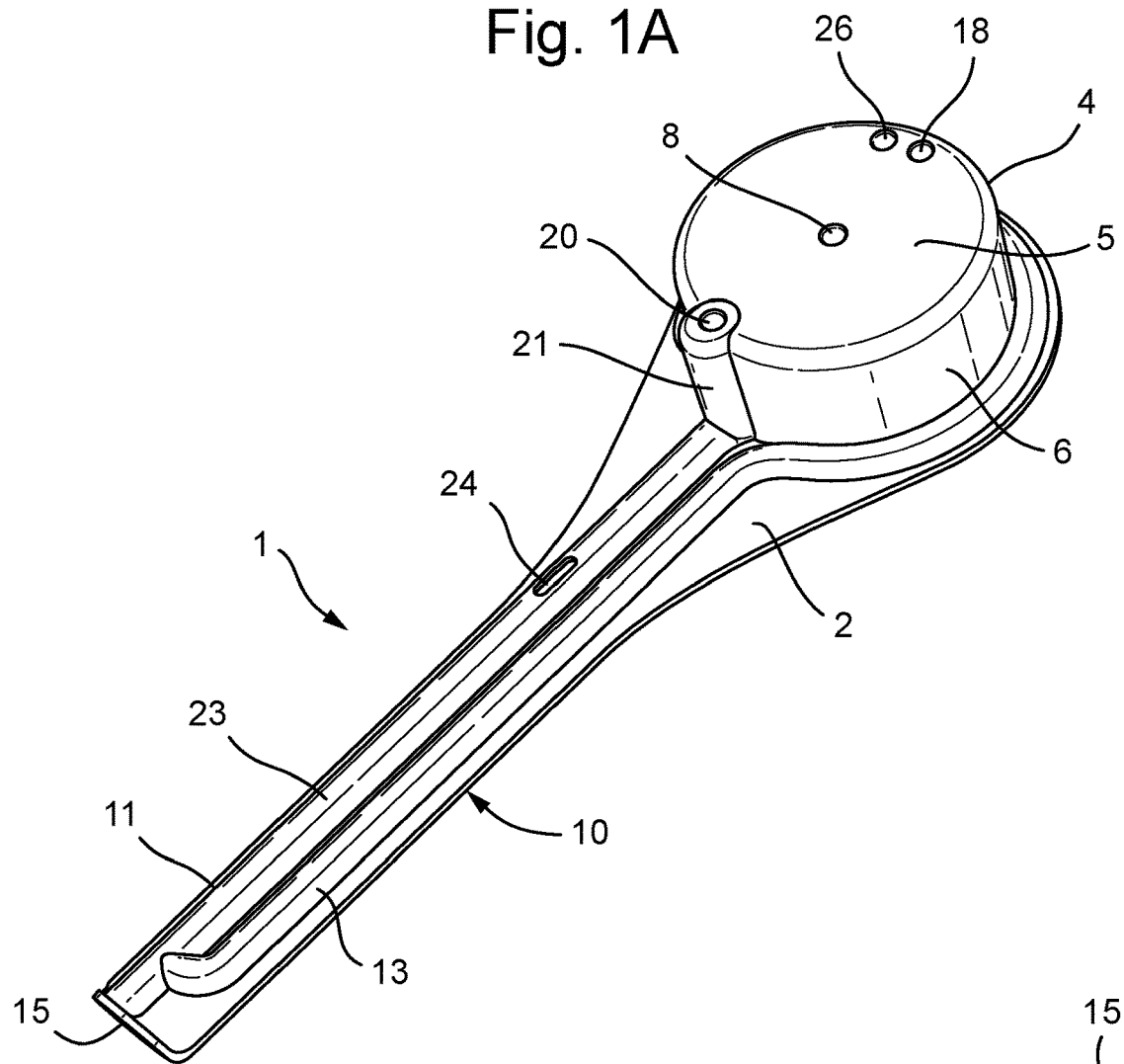
FIG. 1A shows a first embodiment of a container according to the invention in a perspective view showing the bottom of the container.
Figure 1B:
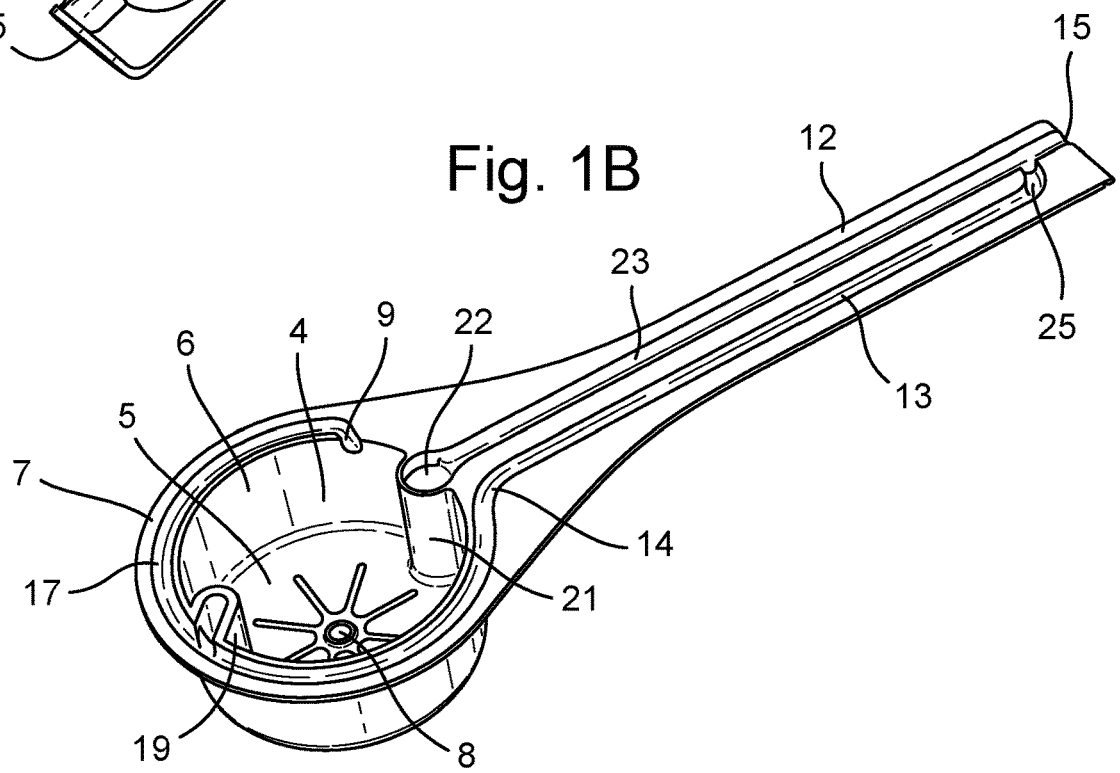
FIG. 1B shows the first embodiment of a container according to the invention in a perspective view showing the top of the container.

FIGS. 1A and 1B schematically show a first embodiment of a container 1 for containing RGC. The container 1 includes a base body 2 and a cover 3 (FIG. 1C). The base body 2 is molded from as PLA and comprises an RGC chamber 4 defined by a chamber bottom 5 and a chamber wall 6 at the perimeter of the chamber bottom 5. Although in the shown embodiment the wall has a circular circumference, in other embodiments the wall may have other shapes, such as of a polygon or an oval. The chamber 4 of the base body is open at the side opposite the chamber bottom 5 for receiving an amount of RGC preferably equivalent to an amount for a single serving of coffee.

The chamber wall 6 has a sealing surface 7 at its free end opposite the chamber bottom 5, such that the cover 3 can be attached to the sealing surface 7 of the chamber wall 6 for closing the RGC chamber 4.

The container 1 further comprises an intake opening 8 for taking in water into the RGC chamber 4, which intake opening is formed by a pierceable water intake portion 8 provided in the chamber bottom 5. The container 1 in addition comprises a dispensing opening 9 for dispensing a coffee beverage from the RGC chamber 4 provided in the sealing surface 7 of the chamber wall 6.

The container furthermore comprises an elongated handle 10 extending in a direction having a radial component outward from the beverage base material chamber 4. The elongated handle 10 is integral with the base body 2 and comprises a handle bottom 11 and a handle sealing flange 12. The handle 10 is provided with an outlet channel 13 extending from an upstream channel inlet 14 communicating with the dispensing opening 9 to a downstream channel outlet 15 provided at the free end of the handle 10. The handle sealing flange 12 is flush with the sealing surface 7 of the chamber wall 6 so that the cover 3 can also be attached to the sealing flange 12 of the handle 10 for closing the outlet channel 13 in a direction opposite the handle bottom 11. As can be seen in FIG. 1D the sealing flange 12 of the handle 10 surrounds the channel outlet 13, so that when the cover 3 is attached to the sealing flange 12 the channel outlet 13 is completely closed even at the location of the channel outlet 15 (see FIG. 1C). To open the channel outlet 15 by the pressure created by the beverage dispensed through the outlet channel 13 the cover 3 is weakened at the location 16 of the channel outlet.

In the embodiment shown in FIG. 1 the height of the chamber wall 6 is about five times the height of the elongated handle 10. This ensures easy handling while enabling a sufficient amount of RGC to be received within the chamber 4 without a superfluous use of material. It shall be clear that in other embodiments the height ratio can be at least four or at least six depending on amongst other things the amount of RGC to be contained within the chamber 4.

The upstream channel inlet 14 communicates with the dispensing opening 9 via a peripheral dispensing channel 17 provided in the sealing surface 7 of the chamber wall 6 to obtain a compact container 1. The chamber bottom 5 is further provided with a pierceable extraction medium bypass intake portion 18 which via an extraction medium bypass pipe 19 in the chamber wall 6 discharging in the peripheral dispensing channel 17 leads to the upstream channel inlet 14 of the outlet channel 13 of the handle 10. By using an extracting medium bypass 18, 19 a more consistent output of beverage from the container 1 can be obtained and furthermore the strength of the prepared beverage can be adjusted via said extracting medium bypass.

In the embodiment of a container 1 shown in FIGS. 1A-F the chamber bottom 5 is further provided with a pierceable steam inlet portion 20 which via a steam inlet pipe 21 in the chamber wall 6 leads to an upstream steam channel inlet 22 of a steam outlet channel 23 which is provided in the handle 10. The steam outlet channel 23 ends in a downstream steam channel outlet provided at the free end of the handle 10, which in the shown embodiment coincides with the outlet 15. This is realized in that the outlet channel 13 discharges into the steam channel 23 at a location 25 at a distance from the free end of the handle 10. In other embodiments of the container (not-shown) the outlet of the steam channel 23 and the outlet of the outlet channel 13 can be separate from each other.

As can be seen in FIG. 1C the cover 3 also closes off the steam channel 23 in a direction opposite the handle bottom 11. In this manner the container 1 itself can be used to supply steam, e.g. into fresh milk poured into a cup to prepare milk foam. An air inlet slot 24 is provided in the handle bottom 11 opening into the steam channel 23. This air inlet slot 24 allows air to be sucked into the steam channel 23 when steam is being passed therethrough in order to provide a more consistent flow of steam through the steam channel 23.

Please note that in other embodiments the air inlet opening can be formed by one or more air inlet holes.

A pierceable aroma vent portion 26 is provided in the chamber bottom 4 for after being pierced letting aroma escape from the container 1 during extraction of the beverage. The cover 3 is at least partially transparent at a location 27 opposite the chamber bottom so that e.g. the extraction process can be followed by a user.

The handle 10 is provided with a marking 28 for indicating a minimum level of milk to be combined with the beverage and can be surrounded with a (not shown) manually removable paper sleeve which is to be removed before use. The outer surface of the chamber bottom 5 of the container 1 can be provided with a manually removable sealing membrane, which is to be removed before use.

Container variants that do not require the use of steam for e.g. foaming milk or in case the user does not wish to use steam, the base body 2 can be provided with a tear line 29 between the beverage base material chamber 4 and the handle 10 so that the handle 10 can be manually removed.

Figure 1G:
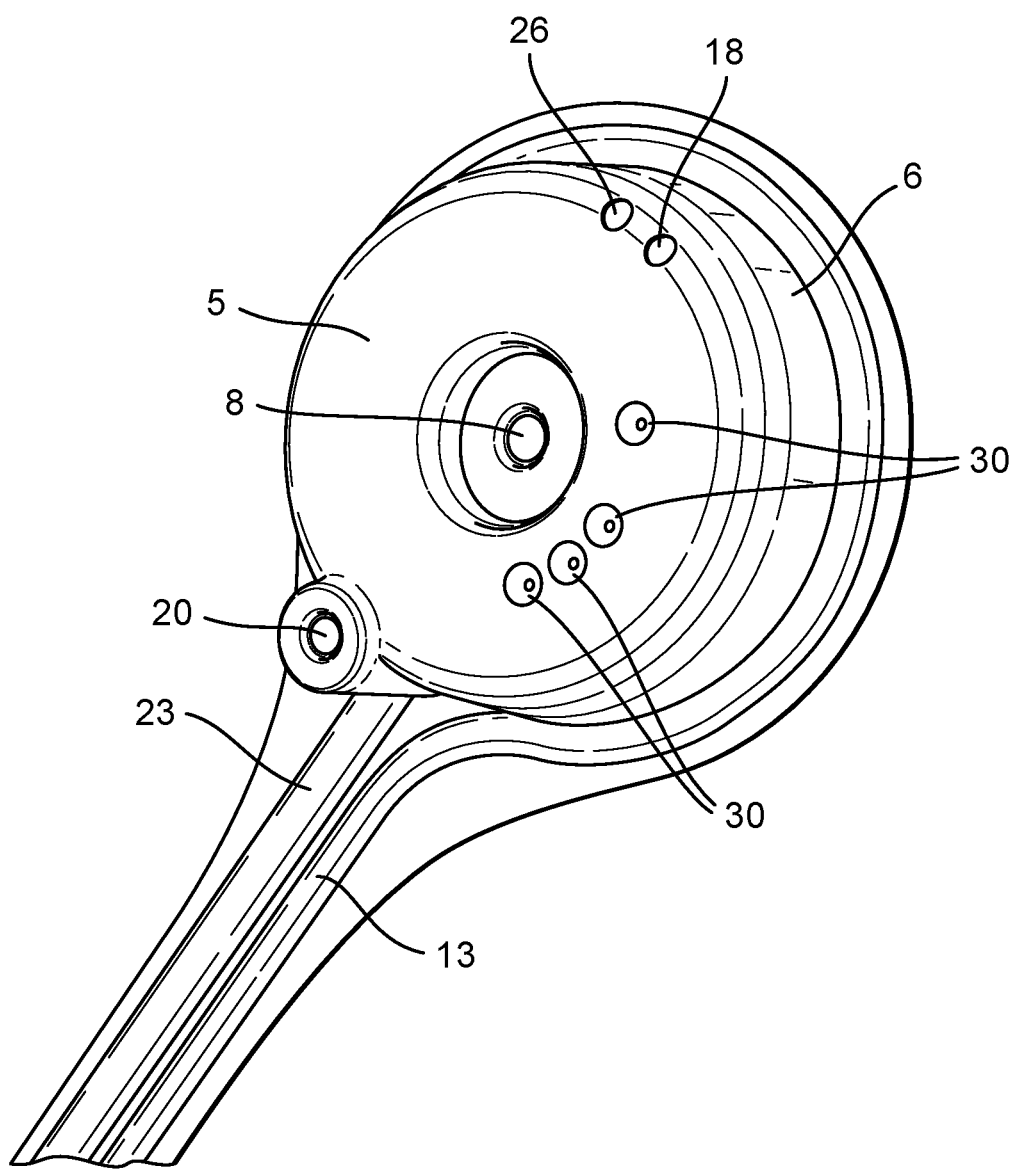
FIG. 1G shows a second embodiment of a container according to the invention comprising an identifier.

In FIG. 1G a second embodiment of a container 1 according to the invention is partly shown. The container 1 according to this second embodiment differs from the one shown in FIGS. 1A-1F in that it comprises an identifier 30 in the form of depressions in the chamber bottom 4, which, when read by a reader in an apparatus for preparing a beverage, provides data e.g. relating to the type of RGC contained within the container which can be used to control the operation of the beverage preparation apparatus such as to prepare the beverage in an optimal, default manner, e.g. by adjusting the temperature and amount of hot water to be supplied into the beverage base material chamber and/or the temperature and duration of supplying steam into an amount of milk poured into a cup in dependence of the read data.

Figure 3B:
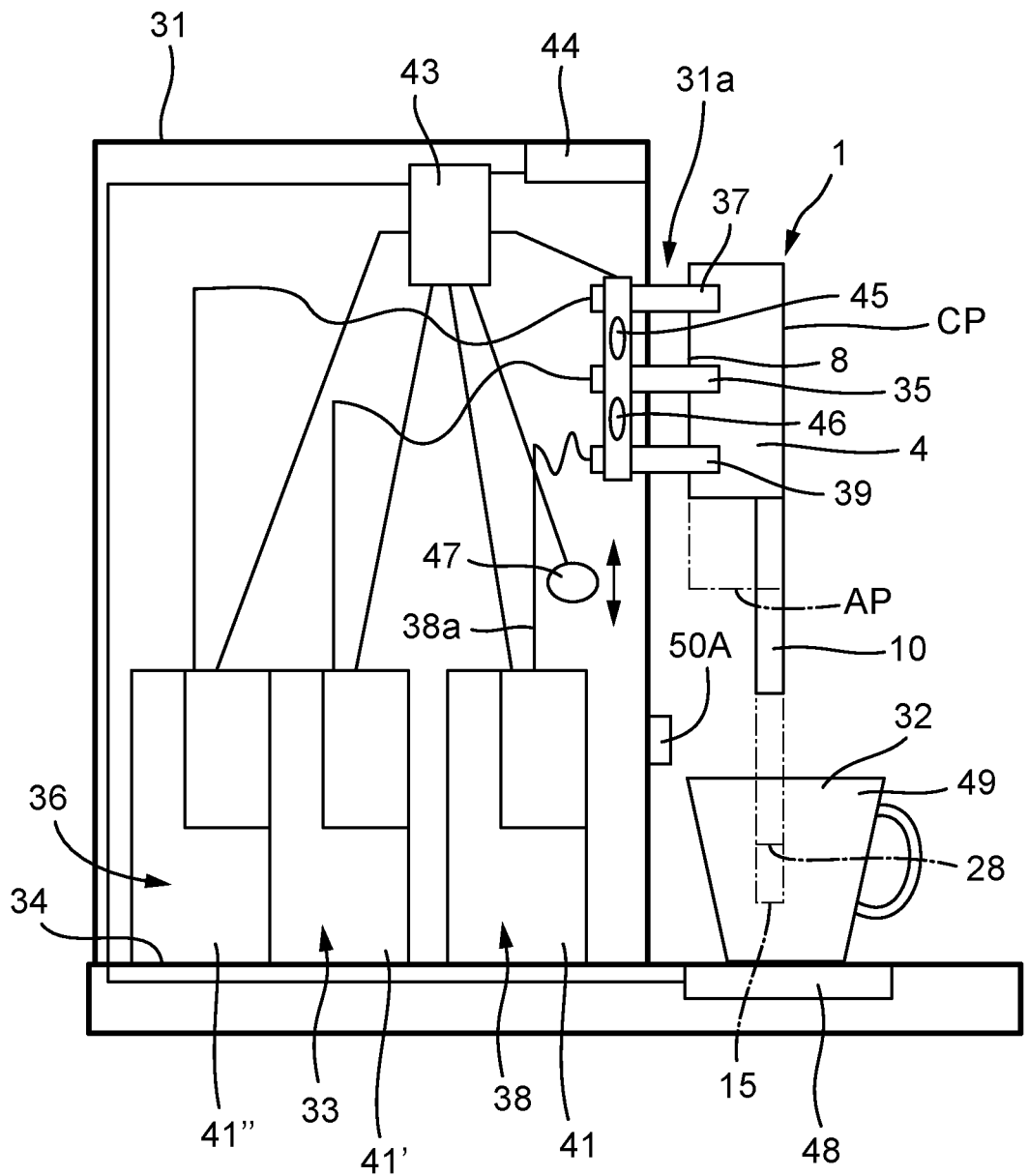
FIG. 3B schematically shows the system of FIG. 3A in cross-section.

In FIG. 2 an automatic beverage preparation apparatus 31 having a container holder 31a to which an inventive container can be connected for preparing a beverage is schematically shown in perspective. In FIG. 3A the beverage preparation system in which the container 1 is connected to the apparatus 31 in the operative position is shown, while milk, as additional ingredient, is poured into a cup 32. The system of FIG. 3A is schematically shown in cross-section in FIG. 3B.

The automatic beverage preparation apparatus 31 comprises a water supplying device 33 for supplying water into the RGC chamber 4 of the container 1 and thus the apparatus 31 itself can be free of a brewing chamber. The water supplying device 33 comprises a horizontal support surface 34 and a water supplying nozzle 35 on which the container 1 can be pushed so that the water supplying nozzle 35 penetrates the pierceable water intake portion and the container holder 31a is arranged so that the container 1 is removably connected to the apparatus 31. The container 1 is connected to the automatic beverage preparation apparatus 31 such that the elongated handle 10 is positioned at least substantially vertically with the channel outlet 15 pointing downwards into the cup 32 for dispensing a coffee beverage from the RGC chamber 4 in a substantially vertical direction. The apparatus 31 is also provided with a water bypass supplying device 36 having a water bypass supplying nozzle 37 which pierces the pierceable water bypass intake portion upon connecting the container 1 to the automatic beverage preparation apparatus 31 and with a steam supplying device 38 having a steam conduit 38a connected to a steam supplying nozzle 39 which pierces the pierceable steam inlet portion of the container upon connection of the container 1 to the automatic beverage preparation apparatus 31. The steam conduit 38a can comprise an air inlet (not shown), e.g. formed by a venturi or a slot in the conduit, so that air can be sucked into the steam conduit 38a when steam is being passed therethrough. In another embodiment of the invention the apparatus may comprise an air pump (such as a diaphragm pump) connected to the air inlet via an active air inlet tube, preferably comprising an air orifice. The addition of air into the steam conduit provides a more consistent flow of steam. In a further embodiment shown in FIGS. 6A-C the steam conduit 38a may comprises a passive air inlet 38b as well as an air pump 38c connected to an active air inlet 38d, whereas the beverage preparation apparatus comprises a valve 38e displaceable in a respective connection position for either connecting the steam conduit 38a to the passive air inlet 38b (FIG. 6C) or the active air inlet 38d (FIG. 6B).

The water needed for the devices 33, 36 and 38 can be provided by a detachable water reservoir 40 which communicates with water holders 41, 41', 41" of the devices 33, 36 and 38, respectively.

As shown in FIG. 2 the automatic beverage preparation apparatus 31 also comprises an aroma vent piercer 42 which pierces the pierceable aroma vent portion upon connection of the container to the automatic beverage preparation apparatus 31. In this manner aroma produced during preparation of the beverage by extraction can escape through the aroma vent portion to provide a user with an increased taste and smell sensation.

A control device 43 is included in the apparatus 31 for controlling the operation of the water and steam supply devices 33, 36, 38. The control device 43 and/or the apparatus 31 can be switched on by means of an on/off switch 44 e.g. at the top of the apparatus 31, but in order to ensure reproducible and safe use of the apparatus 31, the beverage preparation system is arranged for enabling operation by means of the control device 43 only after the container 1 has been connected to the container holder 31a of the automatic beverage preparation apparatus 31. Such connection can e.g. be established by means of detectors 45, 46. In the embodiment shown in FIG. 3 the apparatus 31 is arranged such that the nozzles 35, 37 and 39 and the aroma vent 42 are displaceably mounted between an upper connecting position CP indicated with full lines in FIG. 3B and a lower activating position AP indicated with broken lines in FIG. 3B. The apparatus 31 comprises a sensor 47 which can establish whether the nozzles are in the upper connecting position CP or in the lower activating position AP and which sends signals to the control device 43 indicative of the position in which the nozzles are present. In this manner the said beverage preparation system can be arranged for enabling operation by means of the control device 43 only when the nozzles are in the activating position.

The automatic beverage preparation apparatus 31 comprises a reader for reading data from the identifier 30 of the container 1, which reader in the present embodiment is formed by the detectors 45, 46. The reader 45, 46 provides a signal indicative of the read identifier to the control device 43 which can control the operation of the automatic beverage preparation apparatus 31 in dependence on said read data. In particular the control device 43 can comprise a (not-shown) memory which contains processing profiles which are tailored for a particular type of roasted ground coffee. Each of these processing profiles can instruct the control device 43 to control the device supply devices 33, 36 and 38 for, in use, performing a respective default process on the particular type of roasted ground coffee which processing profile is selected upon reading the identifier 30. In this manner e.g. the amount and temperature of hot water which is to be supplied to the chamber 4 can be automatically set by the control device 43 upon reading the identifier. In addition as an alternative or in addition to the on/off switch 44 the apparatus 31 can comprise a user control panel in which the user can set his or her own processing profiles or preferences which overrule the processing profiles stored in the memory of the control device.

The beverage preparation apparatus as shown in FIG. 3 comprises a beverage temperature sensor 50 for sensing a temperature of the beverage dispensed or present in the cup 49. The temperature sensor 50 is operationally connected to the control device for supplying thereto a signal indicative for the measured beverage temperature. The control device 43 may be arranged for controlling the beverage preparation apparatus based on the signal indicative for the measured beverage temperature. In particular, the supply of steam can be controlled based on the measured temperature. In a particular embodiment of the invention the beverage temperature sensor 50 comprises at least one microphone 50A, which in the shown embodiment is positioned above the cup.

In FIG. 3B it is indicated that the automatic beverage preparation apparatus 31 comprises a milk amount detector 48, in this embodiment a weighing scale for detecting the amount of milk which is present in a cup 49. The milk amount detector 48 supplies a signal to the control device 43 indicative for the detected amount. The control device 43 can then control the operation of the steam supplying device 38 in dependence on the amount of milk in the cup 49.

In FIGS. 4A-4F a third embodiment of a container (called third container in the following) according to the invention is shown and parts of the third container which are similar to the first and second embodiment are indicated by the same reference numbers.

Figure 4E:
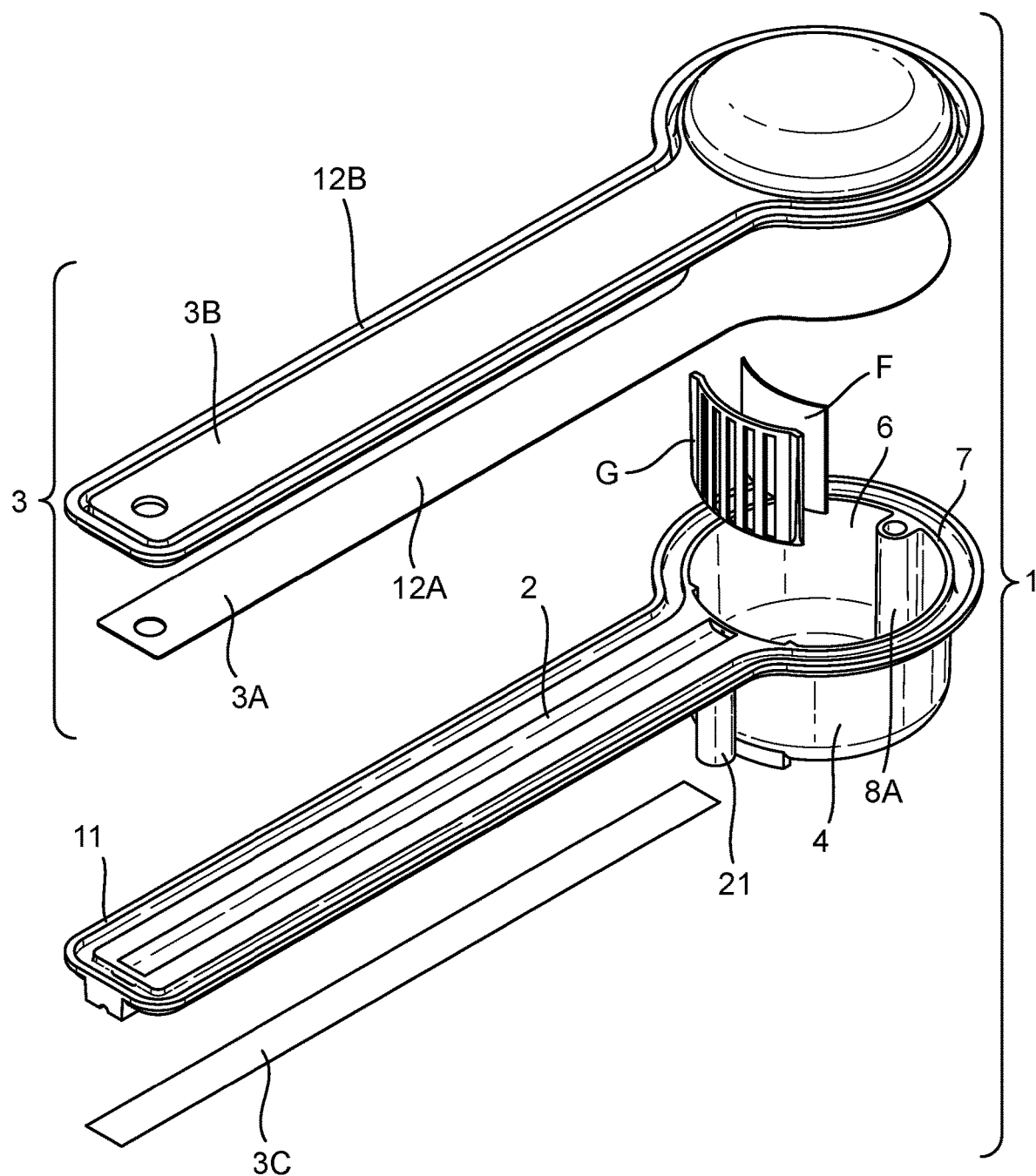
FIG. 4E shows the third embodiment of a container according to the invention in an exploded view in perspective.
Figure 5E:
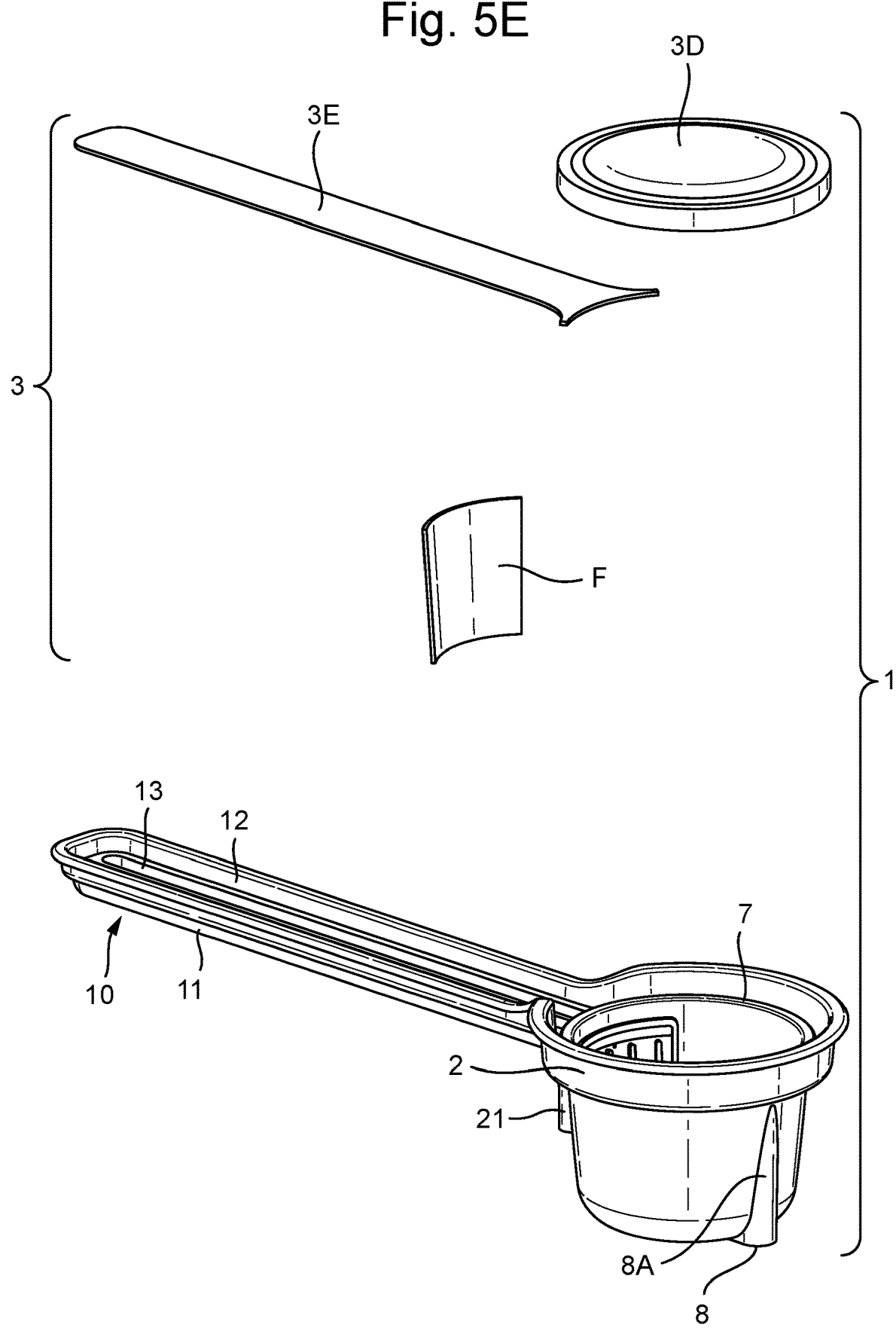
FIG. 5E shows the fourth embodiment of a container according to the invention in an exploded view in perspective.

The third container 1 includes a base body 2 and a cover 3 (FIG. 4E). The base body 2 is molded from as PLA and comprises an RGC chamber 4 defined by a chamber bottom 5 and a chamber wall 6 at the perimeter of the chamber bottom 5. Although in the shown embodiment the wall has a circular circumference, in other embodiments the wall may have other shapes, such as of a polygon or an oval. The chamber 4 of the base body is open at the side opposite the chamber bottom 5 for receiving an amount of RGC preferably equivalent to an amount for a single serving of coffee.

The chamber wall 6 has a sealing surface 7 at its free end opposite the chamber bottom 5, such that the cover 3 can be attached to the sealing surface 7 of the chamber wall 6 for closing the RGC chamber 4. The cover 3 is in this embodiment formed by a perforated membrane or porous filter 3A and a cover element 3B. The cover element 3B is dome shaped above the RGC chamber 4 while the membrane or porous filter 3A is flat, thereby forming an additional chamber 4A in which an additional beverage base material, preferably different from roasted ground coffee in the chamber 4, can be contained.

The container 1 further comprises an intake opening 8 for taking in water into the RGC chamber 4, which intake opening is formed by a pierceable water intake portion 8 provided in the chamber bottom 5. The third container 1 further comprises an extraction medium inlet pipe 8A extending from the pierceable extraction medium intake portion 8 into the beverage base material chamber, preferably up to the perforated membrane or porous filter 3A. In this manner extraction medium is provided to the additional beverage base material and then flows to the RGC in the chamber 4 via the perforated membrane or porous filter. The container 1 in addition comprises a dispensing hole 9 in the chamber wall 6 for dispensing a coffee beverage from the RGC chamber 4. In front of dispensing hole 9 within the chamber 4 a grid G and a filter sheet F are provided to prevent clogging of the opening 9.

The container furthermore comprises an elongated handle 10 extending in a direction having a radial component outward from the beverage base material chamber 4. The elongated handle 10 is integral with the base body 2 and comprises a handle bottom 11 and a handle sealing flange 12A, B. The handle 10 is provided with an outlet channel 13 (see also FIG. 4D1) extending from an upstream channel inlet 14 communicating with the dispensing opening 9 to a downstream channel outlet 15 provided at the free end of the handle 10. The handle sealing flange 12 is flush with the sealing surface 7 of the chamber wall 6 so that the cover 3 can also be attached to the sealing flange 12 of the handle 10 for closing the outlet channel 13 in a direction opposite the handle bottom 11. As can be seen in FIG. 4F the sealing flange 12 of the handle 10 covers the outlet channel 13. The upstream channel inlet 14 directly communicates with the dispensing hole 9 to obtain a compact container 1.

In the embodiment of the third container 1 shown in FIGS. 4A-F the chamber bottom 5 is further provided with a pierceable steam inlet portion 20 which via a steam inlet pipe 21 leads to an upstream steam channel inlet 22 of a steam outlet channel 23 positioned below the outlet channel 13 which are both provided in the handle 10. The steam outlet channel 23 ends in a downstream steam channel outlet SO provided at the free end of the handle 10.

As can be seen in FIGS. 4E and 4F a cover part 3C also closes off the steam channel 23 in a direction opposite the handle bottom 11. In this manner the container 1 itself can be used to supply steam, e.g. into fresh milk poured into a cup to prepare milk foam.

In FIGS. 5A-5E a fourth embodiment of a container (called fourth container in the following) according to the invention is shown and parts of the fourth container which are similar to the first, second and third embodiment are indicated by the same reference numbers.

The fourth container 1 includes a base body 2 and a cover 3 comprising a disc shaped part 3D and an elongate part 3E. The base body 2 is molded from as PLA and comprises an RGC chamber 4 defined by a chamber bottom 5 and a chamber wall 6 at the perimeter of the chamber bottom 5. Although in the shown embodiment the wall has a circular circumference, in other embodiments the wall may have other shapes, such as of a polygon or an oval. The chamber 4 of the base body is open at the side opposite the chamber bottom 5 for receiving an amount of RGC preferably equivalent to an amount for a single serving of coffee.

The chamber wall 6 has a sealing surface 7 at its free end opposite the chamber bottom 5, such that the disk shaped cover part 3D can be attached to the sealing surface 7 of the chamber wall 6 for closing the RGC chamber 4.

The fourth container 1 further comprises an intake opening 8 for taking in water into the RGC chamber 4, which intake opening is formed by a pierceable water intake portion 8 provided in the chamber bottom 5. The fourth container 1 further comprises an extraction medium inlet pipe 8A extending from the pierceable extraction medium intake portion 8 into the beverage base material chamber, preferably up to half the height of the chamber 4. In this manner extraction medium is provided in the additional beverage base material for a correct extraction. The fourth container 1 in addition comprises a dispensing hole 9 in the chamber wall 6 for dispensing a coffee beverage from the RGC chamber 4. In front of dispensing hole 9 within the chamber 4 a grid G and a filter sheet F are provided to prevent clogging of the opening 9.

The fourth container furthermore comprises an elongated handle 10 extending in a direction having a radial component outward from the beverage base material chamber 4. The elongated handle 10 is integral with the base body 2 and comprises a handle bottom 11 and a handle sealing flange formed by cover part 3E. The handle 10 is provided with an outlet channel 13 extending from an upstream channel inlet 14 communicating with the dispensing opening 9 to a downstream channel outlet 15 provided at the free end of the handle 10. The handle sealing flange 12 is flush with the sealing surface 7 of the chamber wall 6 so that the cover 3 can also be attached to the sealing flange 12 of the handle 10 for closing the outlet channel 13 in a direction opposite the handle bottom 11. The upstream channel inlet 14 directly communicates with the dispensing hole 9 to obtain a compact fourth container 1.

In the embodiment of the fourth container 1 shown in FIGS. 5A-E the chamber bottom 5 is further provided with a pierceable steam inlet portion 20 which via a steam inlet pipe 21 leads to an upstream steam channel inlet 22 of a steam outlet channel 23 positioned adjacent the outlet channel 13 which are both provided in the handle 10. The steam outlet channel 23 ends in a downstream steam channel outlet SO provided near the free end of the handle 10.

Figure 7A:
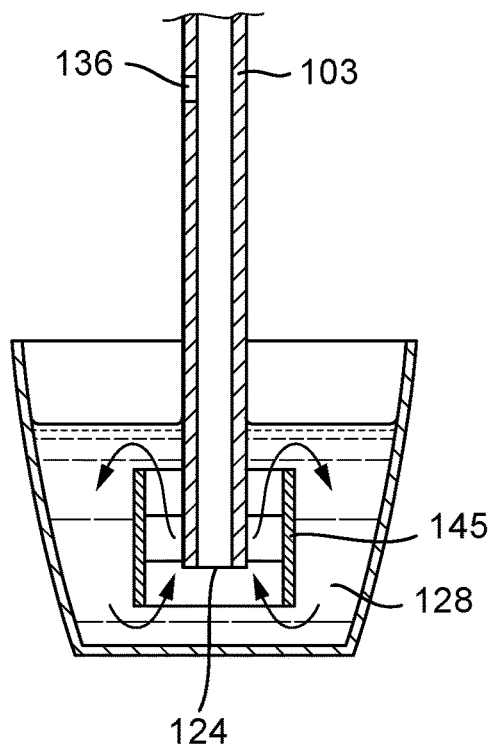

In the embodiment shown in FIG. 7A the elongated handle 103 of a further embodiment of a container according to the invention is shown. The elongated handle has a channel outlet 124 and in the shown embodiment a coaxial circulating sleeve 145 forming a circulation channel (as shown preferably substantially parallel to the outlet channel of the froth wand) between the inner wall of the sleeve 145 and the outer wall of the elongated handle 103 for realizing a circulation of steam and milk in the circulation channel as indicated by the arrows for more efficiently heating and frothing the milk 128. Please note that since the circulating sleeve 145 is provided at the end of the elongated handle 103 it can be easily submerged into the milk for obtaining a circulation during operation. Air can be introduced in the steam by the air slot 136 in the elongated handle 103, but can alternatively or additionally be introduced in a steam conduit of the device.

Figure 7B:
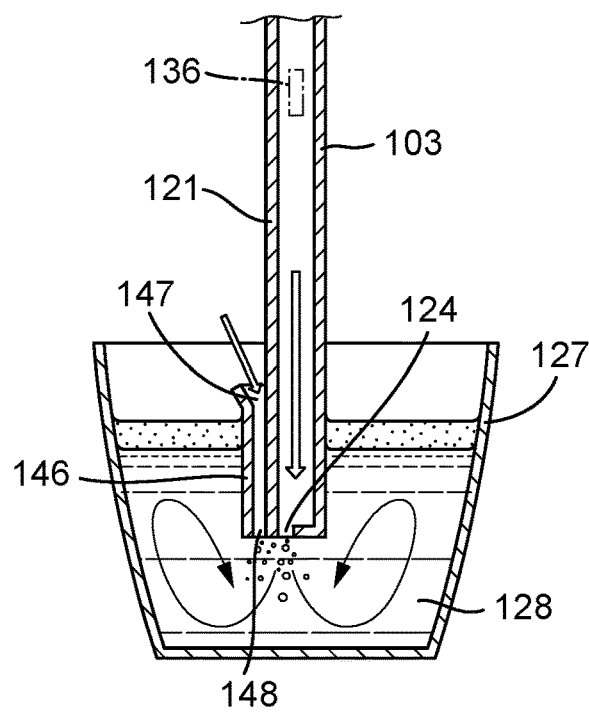

In the embodiment shown in FIG. 7B an addition tube 146 is arranged on the wall 121 near the channel outlet end 124 of the elongated handle 103. The addition tube 146 has an intake opening 147 and an outlet opening 148 separate from the channel outlet 124 but positioned adjacent to the channel outlet 124. In one embodiment of the invention during filling the cup with milk 128 care should be taken that the liquid level does not rise above the intake opening 147 of the addition tube 146. This addition tube 146 can be used in place of the air slot 136 for introducing air into the milk 128. In another embodiment however, this addition tube 146 can be used additional to the air slot 136 (indicated in phantom in FIG. 7B) for either introducing additional air into the milk 128 or when the intake opening 147 is positioned below the level of milk or during use when the level of milk rises above the intake opening 147 to realize circulation of steam and milk in the circulation channel formed between the inner wall of the tube 146 and the outer wall 121 of the elongated handle 103 as indicated by the arrows for more efficiently heating and frothing the beverage milk.

The invention claimed is:

1. A container for containing a beverage base material, said container including a base body and a cover, said base body comprising a beverage base material chamber defined by a chamber bottom and a chamber wall at the perimeter of the chamber bottom, the chamber of the base body being open at the side opposite the chamber bottom, said chamber wall being provided with a sealing surface at its free end opposite the chamber bottom, the cover being attached to the sealing surface of the chamber wall for closing the beverage base material chamber, said container comprising an intake opening for taking in an extraction medium to the beverage base material chamber and a dispensing opening for dispensing a beverage from the beverage base material chamber, wherein the container furthermore comprises an elongated handle extending in a direction having a radial component outward from the beverage base material chamber, said elongated handle being integral with the base body and comprising a handle bottom and a handle sealing flange which is flush with the sealing surface of the chamber wall, said handle being provided with an outlet channel extending from an upstream channel inlet communicating with the dispensing opening to a downstream channel outlet provided at the free end of the handle, said cover being furthermore attached to the sealing flange of the handle for closing the outlet channel in a direction opposite the handle bottom, the sealing flange of the handle surrounding the channel outlet, in that the cover is attached to the sealing flange for closing the channel outlet, and in that the cover is weakened at the location of the channel outlet so that it can be opened by pressure of the beverage dispensed through the outlet channel.

2. The container according to claim 1, wherein the height of the chamber wall is at least four times larger than the height of the elongated handle.

3. The container according to claim 1, wherein said intake opening for taking in an extraction medium to the beverage base material chamber is formed by a pierceable extraction medium intake portion provided in the chamber bottom.

4. The container according to claim 3, wherein the container further comprises an extraction medium inlet pipe extending from the pierceable extraction medium intake portion into the beverage base material chamber.

5. The container according to claim 1, wherein said dispensing opening for dispensing a beverage from the beverage base material chamber is provided in the sealing surface of the chamber wall.

6. The container according to claim 5, wherein said upstream channel inlet communicates with the dispensing opening via a peripheral dispensing channel provided in the sealing surface of the chamber wall.

7. The container according to claim 6, wherein the chamber bottom is provided with a pierceable extraction medium bypass intake portion, in that the chamber wall is provided with an extraction medium bypass pipe extending from the pierceable extraction medium bypass intake portion to the upstream channel inlet of the outlet channel of the handle, wherein the extraction medium bypass pipe discharges into the peripheral dispensing channel provided in the sealing surface of the chamber wall.

8. The container according to claim 1, wherein said dispensing opening for dispensing a beverage from the beverage base material chamber is provided by a dispensing hole in the chamber wall.

9. The container according to claim 1, wherein the chamber bottom is provided with a pierceable extraction medium bypass intake portion, in that the chamber wall is provided with an extraction medium bypass pipe extending from the pierceable extraction medium bypass intake portion to the upstream channel inlet of the outlet channel of the handle.

10. The container according to claim 1, wherein the container is provided with a pierceable steam inlet portion, in that the handle is provided with a steam channel extending from an upstream steam channel inlet to a downstream steam channel outlet provided at the free end of the handle, in that the container is further provided with a steam inlet pipe extending from the pierceable steam inlet portion to the upstream steam channel inlet of the steam outlet channel of the handle, and in that said cover being furthermore attached to the sealing flange of the handle for closing the steam channel in a direction opposite the handle bottom.

11. The container according to claim 10, wherein the steam channel is provided with an air inlet opening, preferably an air inlet slot provided in the handle bottom.

12. The container according to claim 10, wherein the outlet channel discharges into the steam channel at a distance from the free end of the handle and in that the channel outlet is formed by the steam channel outlet.

13. The container according to claim 1, wherein the chamber bottom is provided with a pierceable aroma vent portion.

14. The container according to claim 1, wherein the cover is at least partially transparent, preferably opposite the chamber bottom.

15. The container according to claim 1, wherein the handle is provided with a marking for indicating a minimum level of an additional ingredient to be combined with the beverage.

16. The container according to claim 1, wherein the outer surface of the chamber bottom is provided with a manually removable sealing membrane or cover.

17. The container according to claim 1, wherein the container is provided with a manually removable paper sleeve at least surrounding the handle.

18. The container according to claim 1, wherein the base body is provided with a tear line between the beverage base material chamber and the handle for manually removing the handle.

19. The container according to claim 1, wherein the container is provided with an identifier provided with data, said data being readable by a reader in an apparatus for preparing a beverage, the beverage preparing apparatus being controlled in dependence on the data.

20. The container according to claim 19, wherein the identifier comprises protrusions and/or depressions in the chamber bottom.

21. The container according to claim 1, wherein the base body is molded from bio plastics, such as PLA (TBC).

22. The container according to claim 1, wherein the container contains an amount of roasted ground coffee for a single serving.

23. The container according to claim 1, wherein the container comprises a circulation channel provided on the elongated handle near the channel outlet end of the elongated handle, said circulation channel having an intake opening and a separate outlet opening which latter is positioned adjacent the channel outlet, said circulation channel being preferably substantially parallel to the outlet channel of the elongated handle.

* * * * *